United States Patent [19] [11] Patent Number: 6,064,825
Onuki [45] Date of Patent: *May 16, 2000

[54] CONTROL APPARATUS FOR IMAGE BLUR PREVENTION APPARATUS

[75] Inventor: Ichiro Onuki, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/770,683

[22] Filed: Dec. 17, 1996

Related U.S. Application Data

[63] Continuation of application No. 08/230,714, Apr. 21, 1994, abandoned.

[30] Foreign Application Priority Data

Apr. 22, 1993 [JP] Japan ..................................... 5-117639

[51] Int. Cl.[7] .................................................. G03B 17/00
[52] U.S. Cl. ............................................... 396/55; 396/87
[58] Field of Search ....................... 348/208; 396/52–55, 396/72, 76, 77, 78, 79, 83, 85, 86, 87, 88, 89, 95

[56] References Cited

U.S. PATENT DOCUMENTS

| | | | |
|---|---|---|---|
| 5,020,369 | 6/1991 | Washisu et al. | 73/517 A |
| 5,130,729 | 7/1992 | Sato et al. | 354/202 |
| 5,229,603 | 7/1993 | Shiomi | 250/231.1 |
| 5,266,988 | 11/1993 | Washisu | 354/70 |
| 5,335,032 | 8/1994 | Onuki | 354/195.1 |
| 5,394,207 | 2/1995 | Fujisaki | 354/70 |
| 5,465,924 | 11/1995 | Schneider | 244/118.1 |
| 5,479,236 | 12/1995 | Tanaka | 354/430 |
| 5,619,735 | 4/1997 | Kai | 396/55 |
| 5,678,069 | 10/1997 | Hirano et al. | 396/55 |

FOREIGN PATENT DOCUMENTS

| | | |
|---|---|---|
| 4-20943 | 1/1992 | Japan . |
| 4-21831 | 1/1992 | Japan . |
| 4-86735 | 3/1992 | Japan . |
| 4-218008 | 8/1992 | Japan . |

*Primary Examiner*—David M. Gray
*Assistant Examiner*—Christopher E. Mahoney
*Attorney, Agent, or Firm*—Fitzpatrick, Cella, Harper & Scinto

[57] ABSTRACT

An object of the present invention is to accurately perform focusing adjustment so as to take a picture that is free of an image blur. A prohibition CCPU is provided for prohibiting a change operation of an image blur correction coefficient change means ICPU and a light amount adjustment operation of light amount adjustment means SNS, SDR, and STR from being performed at the same time. Thus, an operation for selectively changing an image blur correction coefficient stored in storage corresponding to movement of a zooming optical member and (or) a focusing adjustment optical member disposed in a focusing optical system is not performed while a photoelectric converting device or a photosensitive material disposed in the vicinity of a focusing plane of the focusing optical system is being performed.

In addition, since the image blur correction coefficient is continuously changed, an image blur error is prevented even if the coefficient is changed.

47 Claims, 18 Drawing Sheets

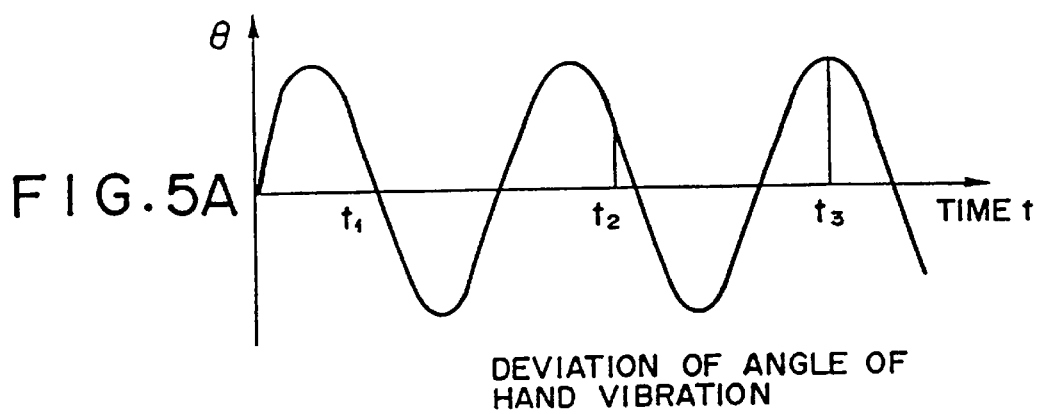
FIG.5A DEVIATION OF ANGLE OF HAND VIBRATION
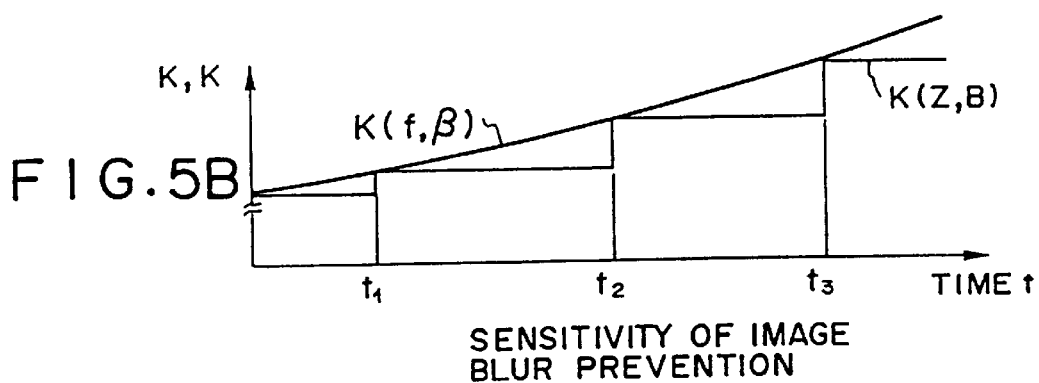
FIG.5B SENSITIVITY OF IMAGE BLUR PREVENTION
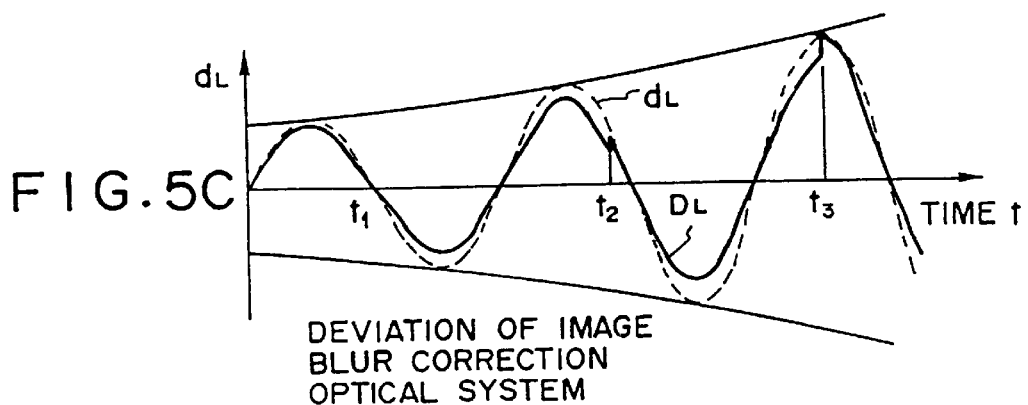
FIG.5C DEVIATION OF IMAGE BLUR CORRECTION OPTICAL SYSTEM
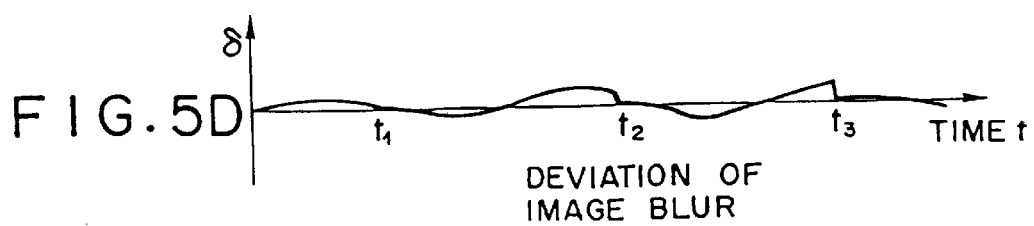
FIG.5D DEVIATION OF IMAGE BLUR

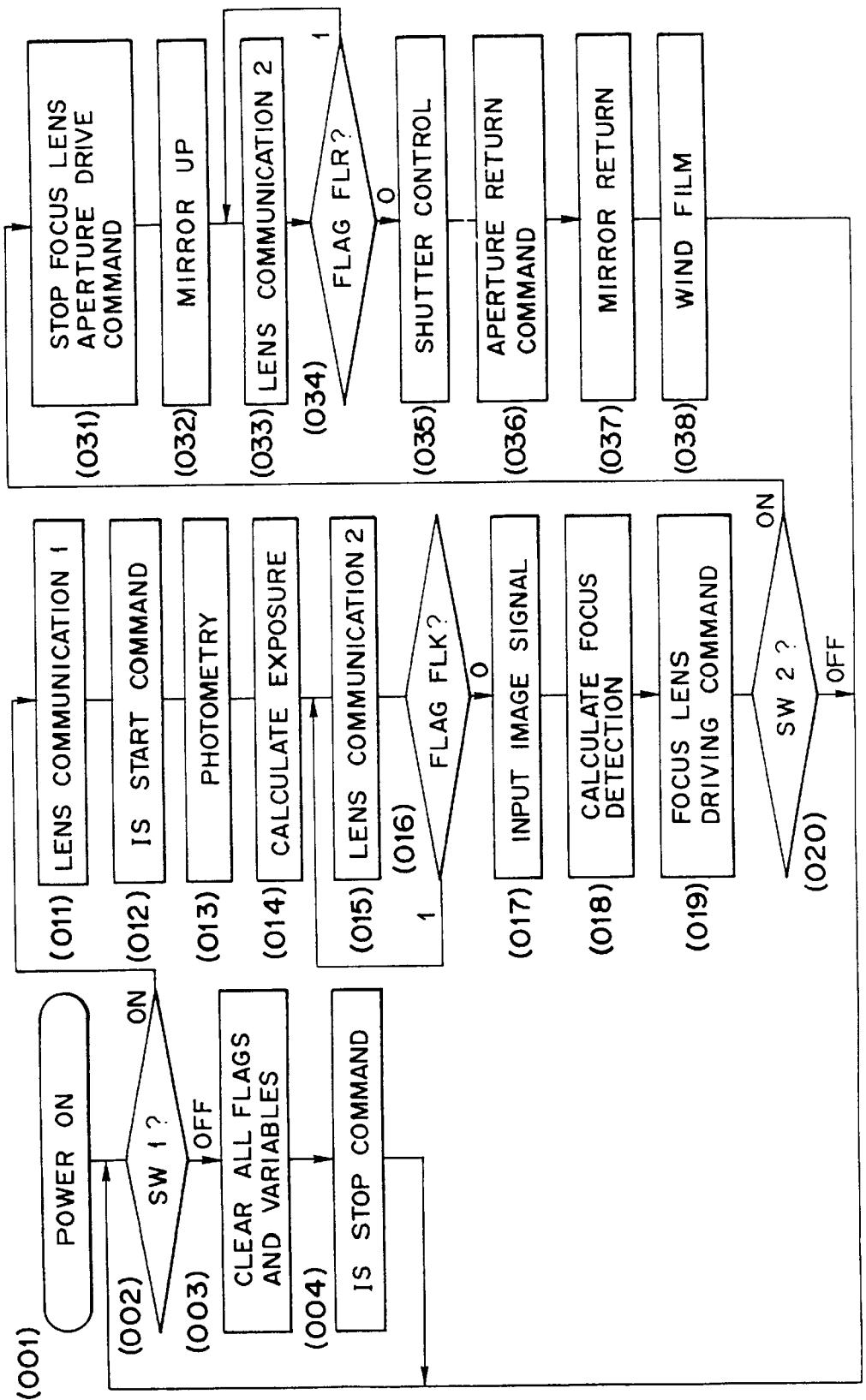

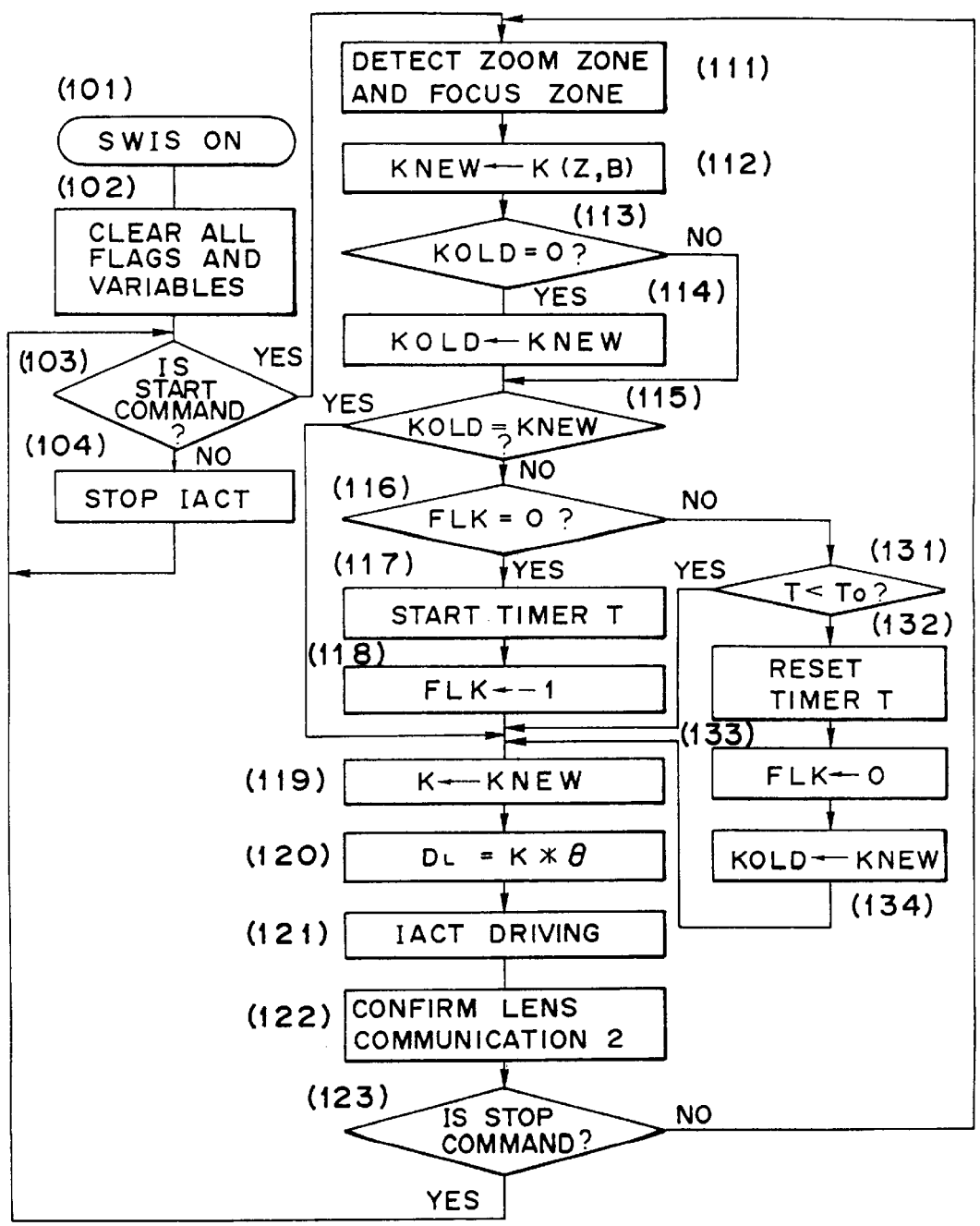

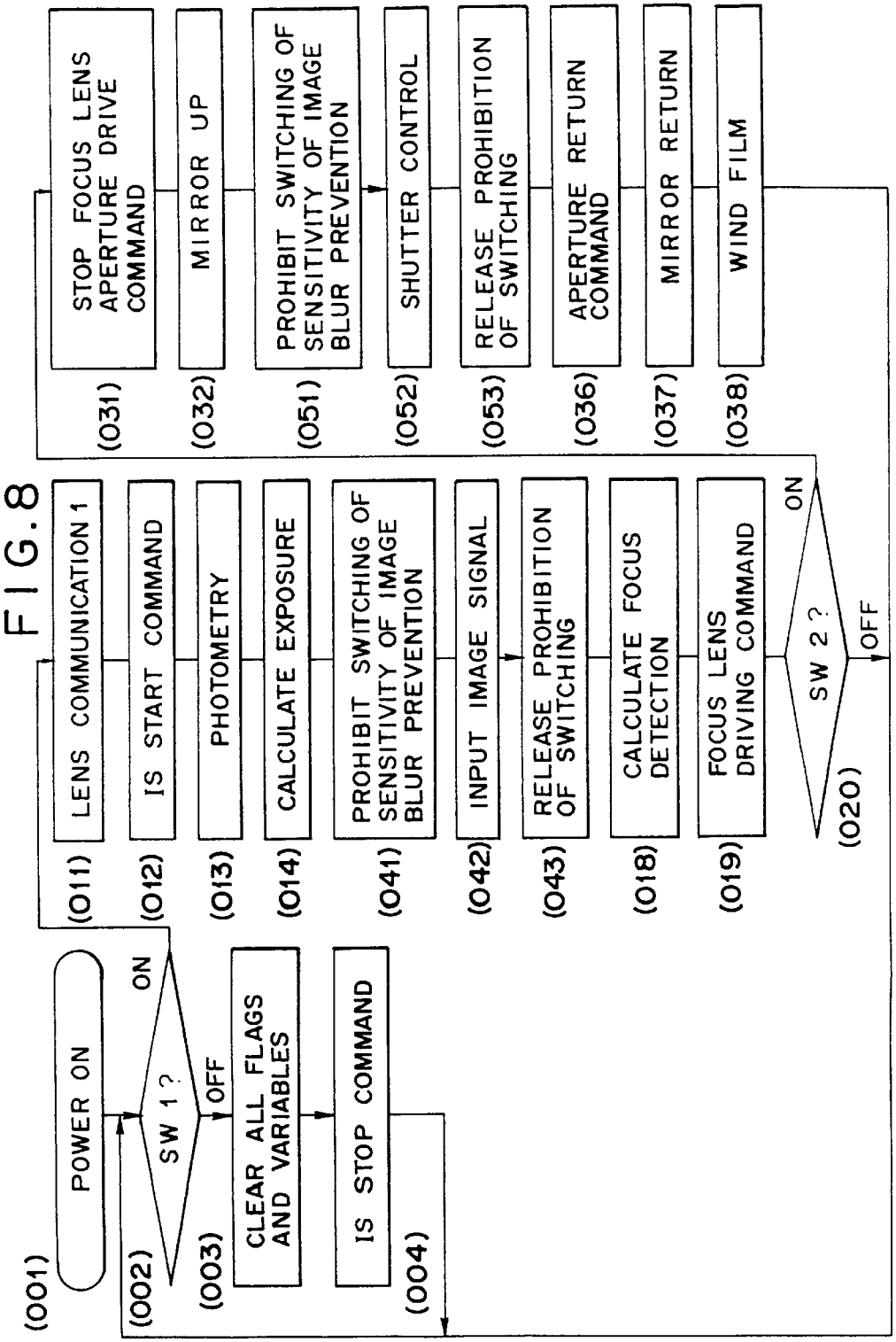

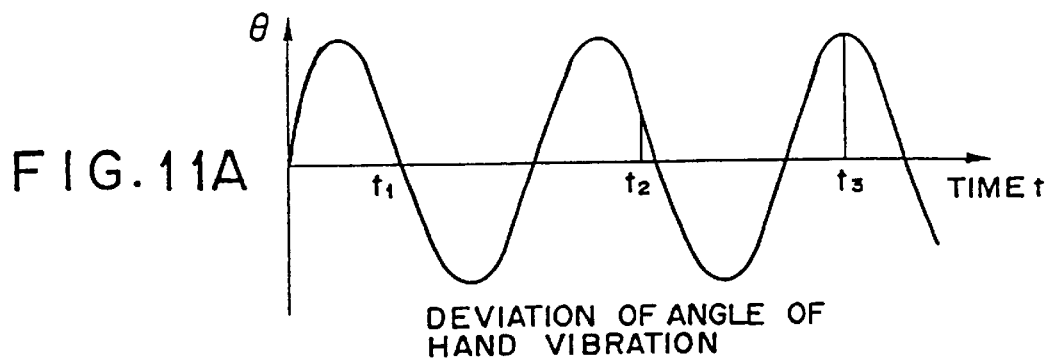
FIG.11A DEVIATION OF ANGLE OF HAND VIBRATION
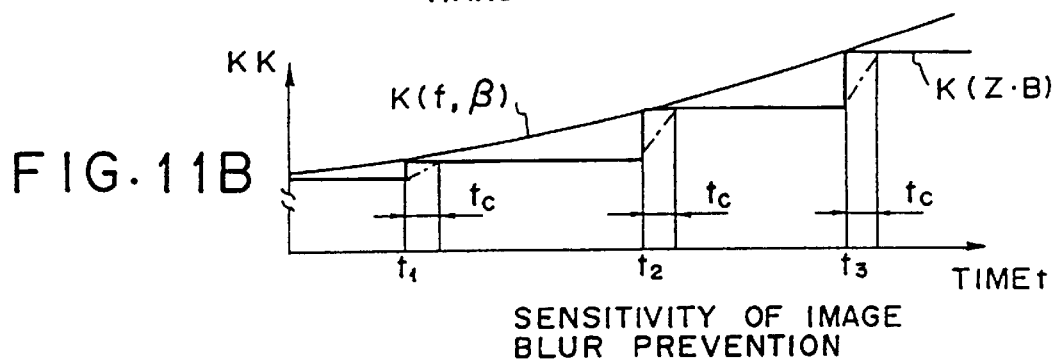
FIG.11B SENSITIVITY OF IMAGE BLUR PREVENTION
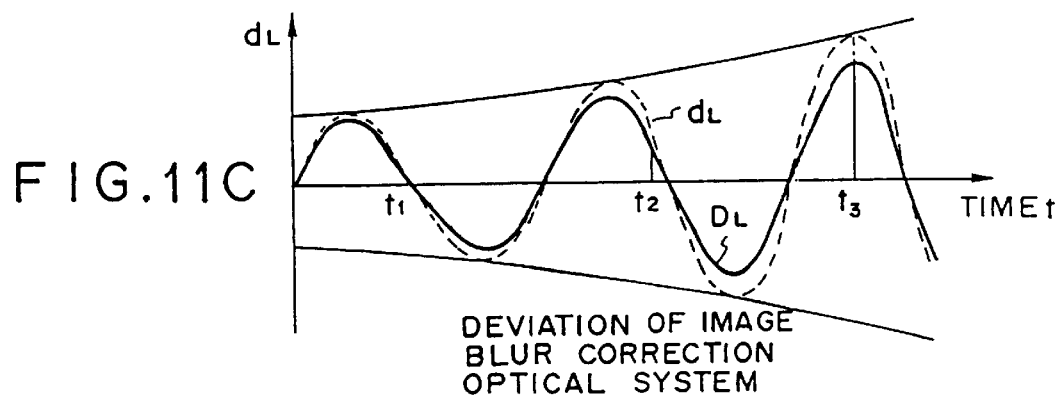
FIG.11C DEVIATION OF IMAGE BLUR CORRECTION OPTICAL SYSTEM
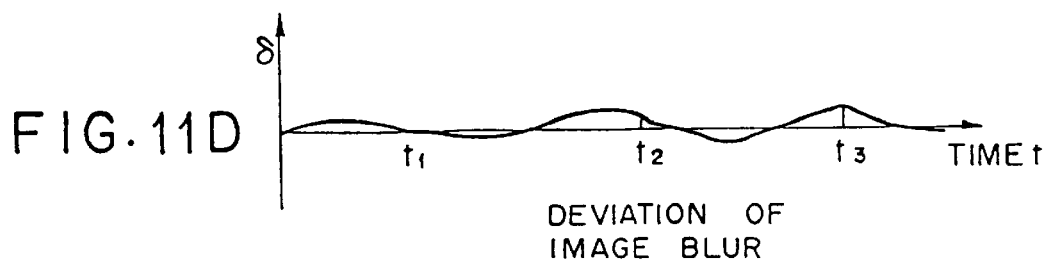
FIG.11D DEVIATION OF IMAGE BLUR

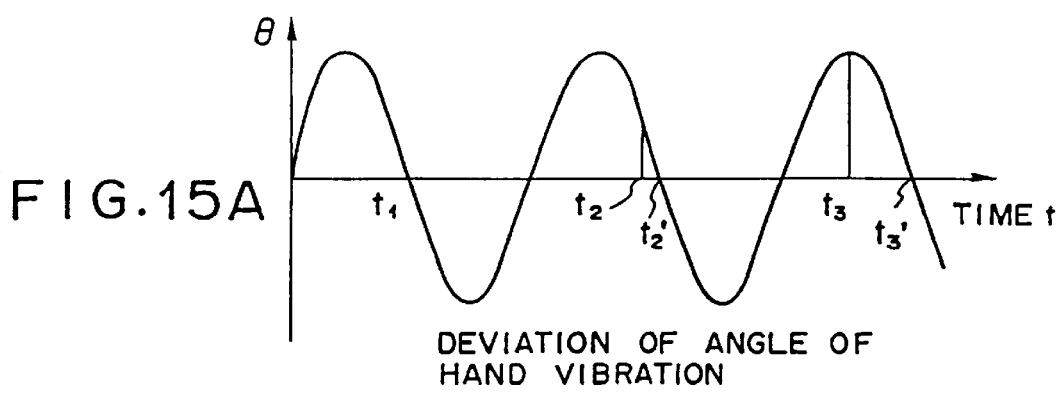
FIG.15A DEVIATION OF ANGLE OF HAND VIBRATION
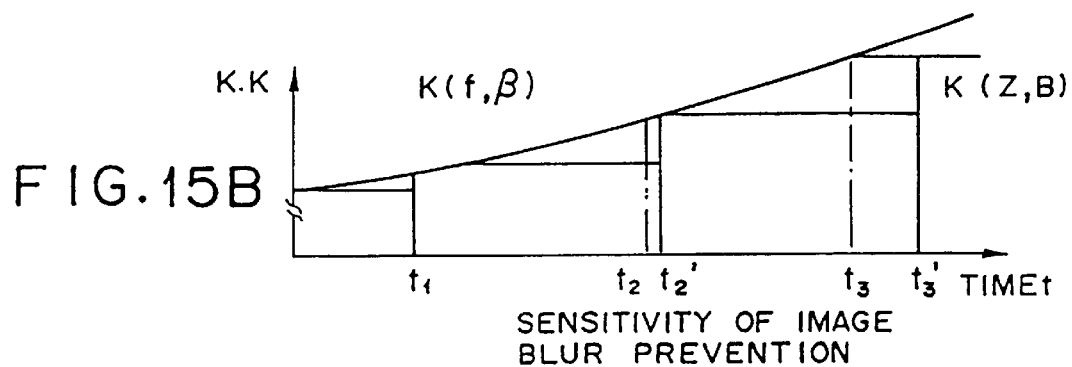
FIG.15B SENSITIVITY OF IMAGE BLUR PREVENTION
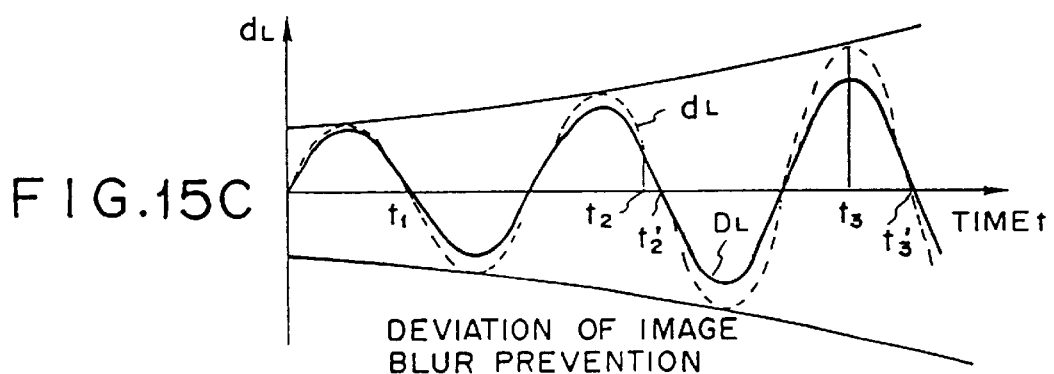
FIG.15C DEVIATION OF IMAGE BLUR PREVENTION
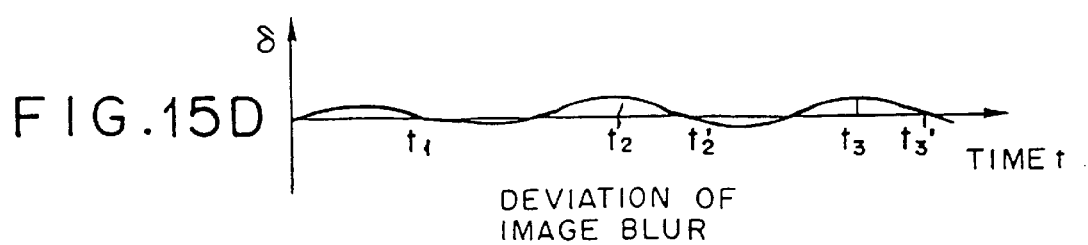
FIG.15D DEVIATION OF IMAGE BLUR F I G . 18
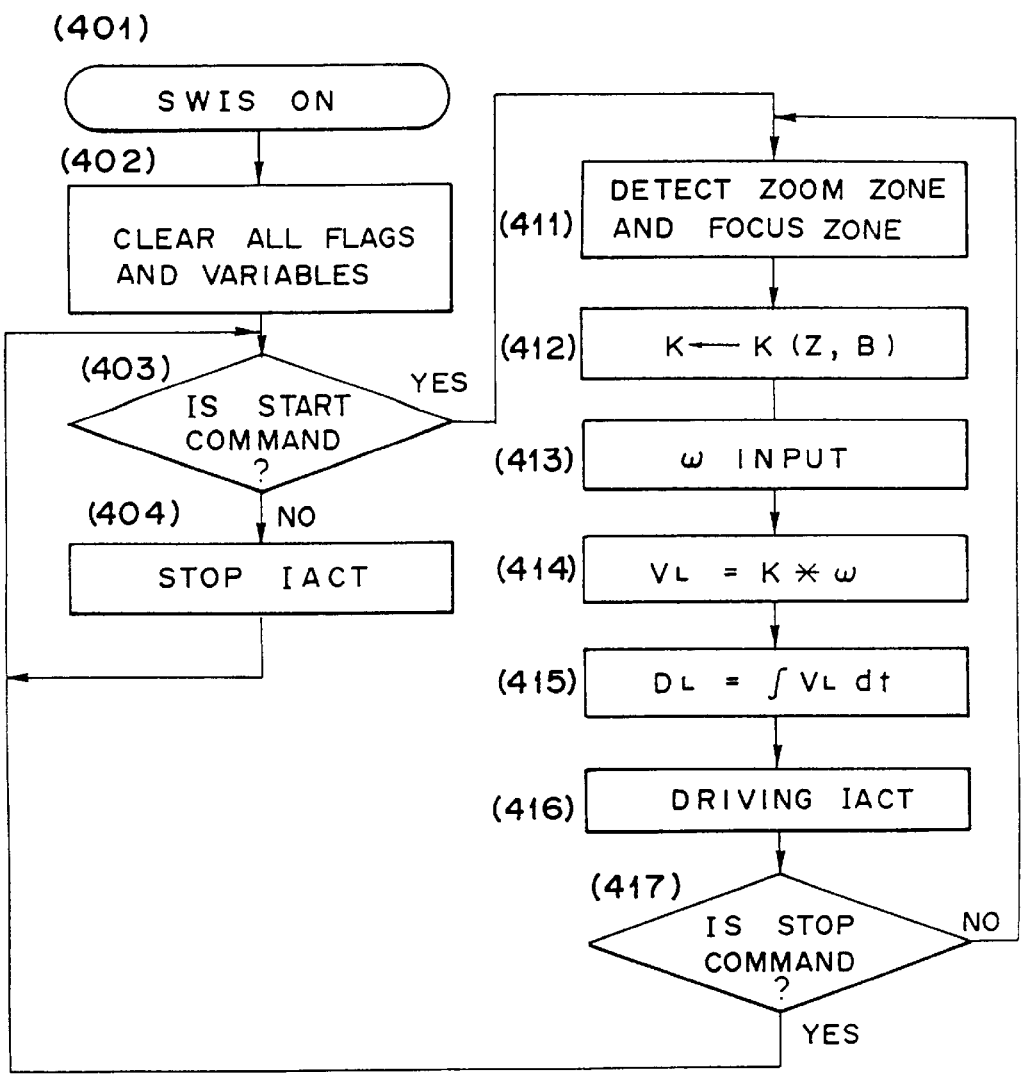

CONTROL APPARATUS FOR IMAGE BLUR PREVENTION APPARATUS

This application is a continuation of application Ser. No. 08/230,714 filed Apr. 21, 1994, now abandoned.

BACKGROUND OF THE INVENTION

1. Field of the Invention

The present invention relates to a control apparatus for use with an image blur prevention apparatus that prevents an image blur from taking place due to a vibration of an optical apparatus such as a camera, a video camera, or the like.

2. Related Background Art

Various image blur prevention apparatuses used for cameras have been proposed. As an example of such apparatuses, a related art reference disclosed as U.S. application Ser. No. 07/701,051, filed May 16, 1991, which was abandoned in lieu of application Ser. No. 08/117,346, filed Sep. 7, 1993, which was abandoned in lieu of application Ser. No. 08/313,398, filed Sep. 27, 1994, which issued as U.S. Pat. No. 5,479,236 on Dec. 26, 1995, is known. In this apparatus, an image blur correction optical mechanism is incorporated into a zoom lens or the like. A drive amount coefficient of the image blur correction optical mechanism corresponding to a zooming operation, namely a variation of image blur prevention sensitivity, is corrected so as to correct an image blur. Thus, a good image blur correction effect is obtained in the entire zoom range. The correction of the variation of the image blur prevention sensitivity is performed in the following two ways.

(A) The positions of a zoom lens and focus lens are read as analog data. The image blur prevention sensitivity is calculated corresponding to the analog data being read. The drive amount of the image blur correction optical apparatus is corrected corresponding to the calculated image blur prevention sensitivity.

(B) The moving ranges of a zoom lens and a focus lens are divided into respective predetermined regions. The value of the image blur prevention sensitivity corresponding to each region is stored in a ROM of a microcomputer. Values stored in the ROM are read from a so-called lookup table. The drive amount of the image blur correction optical mechanism is corrected corresponding to the value being read.

However, such two correction methods have the following problems.

In the method (A), where the image blur prevention sensitivity is calculated with analog values, the following problems take place.

1) The calculation function is complicated. Thus, the image blur prevention sensitivity cannot be simply expressed.

2) An analog position detecting apparatus that detects the positions of the zoom lens and the focus lens with high accuracy (non-linearity), high resolution, and high environmental resisting reliability is expensive.

Thus, the method (A) is not practical. Consequently, the method (B), where the lookup table stored in the ROM of the microcomputer is referenced, is conventionally used.

However, in the method (B), the following problems take place. In this method, the accuracy of the image blur almost depends on the number of divided regions of the zoom zone and focus zone. However, as the number of divided regions increases, the following problems take place.

a) The size of zoom/focus zone detectors that are constructed of a gray code pattern and a detecting brush becomes large.

b) The alignment accuracy of the pattern and brush of the detectors should be improved corresponding to the increase of the number of divided regions.

c) Since storage amount of the lookup table increases, an expensive microcomputer is required.

Thus, the number of divided regions cannot be unconditionally increased. Consequently, the upper limit of the number of divided regions in real products is around 16 (4 bits) or 32 (5 bits).

When the number of divided regions of the zoom zone is 16 and the variation ratio (ratio of the maximum value and the minimum value) of the image blur prevention sensitivity by the zooming is 2.0, the error of the image blur prevention sensitivity is $2^{1/16}=1.044$. Thus, the maximum error amount is 4.4%. This error amount does not remarkably affect the conventional image blur correction. However, when a selected value of the image blur prevention sensitivity table is changed corresponding to the zooming operation and/or the focusing operation, the image blur correction optical mechanism moves slightly, but abruptly. Thus, the image also abruptly moves.

Thus, when the image blur correction apparatus is used for a still camera, if a picture of an object that is being abruptly moved is taken, the picture contains a large image blur.

When the camera is provided with an auto-focus (hereinafter referred to as AF) apparatus, if an image moves while the image is being stored in an AF sensor, the image that is used for measuring the distance between the image and the camera largely blurs, thereby remarkably lowering an image contrast. Thus, the AF accuracy is adversely affected.

In addition, when the image blur correction optical mechanism abruptly moves, an actuator of the mechanism consumes a large amount of electricity. Thus, in addition to this actuator, when another actuator such as a focus drive stepping motor is driven, the stepping motor may not properly work. Moreover, since sufficient electricity is not supplied to the control circuit of the camera, it may malfunction.

SUMMARY OF THE INVENTION

One aspect of the present invention is a control apparatus for preventing an image blur, comprising varying means for varying a relation between a signal relating to a drive of an image blur prevention unit and a drive corresponding to the signal of the image blur prevention unit, for example, a relation between blur detecting signal and blur prevention signal, and prevention means for preventing an adverse influence caused by a abrupt change of the relation by said varying means.

Thus, the other functions of the apparatus such as exposure operation, image signal storage operation, drive means, and so forth can be prevented from being adversely affected.

BRIEF DESCRIPTION OF THE DRAWINGS

FIGS. 5A to 5D are graphs for explaining an image blur correction operation according to the first embodiment of the present invention;

FIG. 6 is a flow chart showing an operation of a microcomputer disposed in the camera of FIG. 1;

FIG. 7 is a flow chart showing an operation of an image blur correction microcomputer of FIG. 1;

FIG. 8 is a flow chart showing an operation of a microcomputer disposed in a camera according to a second embodiment of the present invention;

FIGS. 11A to 11D are graphs for explaining an image blur correction operation according to a fourth embodiment of the present invention;

FIGS. 15A to 15D are graphs for explaining an image blur correction operation according to a seventh embodiment of the present invention;

FIG. 18 is a flow chart showing an operation of an image blur correction microcomputer according to the eighth embodiment of the present invention.

DETAILED DESCRIPTION OF THE PREFERRED EMBODIMENTS

Figure 1:
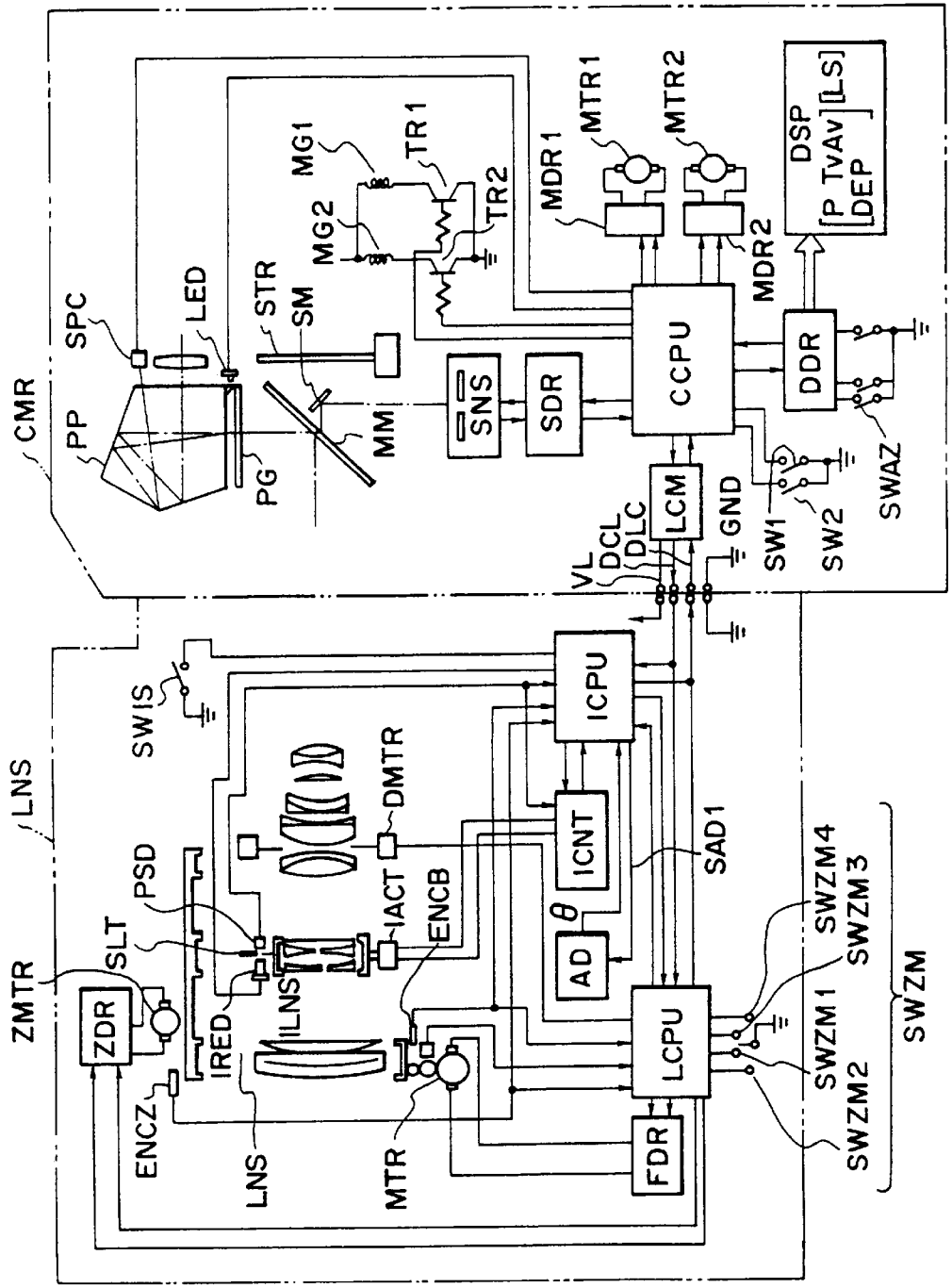
FIG. 1 is a schematic diagram showing a construction of a camera having an image blur correction apparatus according to a first embodiment of the present invention.

Next, with reference to the accompanying drawings, embodiments of the present invention will be described in detail.

First Embodiment

FIGS. 1 to 8 show a first embodiment of the present invention. First, with reference to FIGS. 2A and 2B, an image forming optical system according to the first embodiment will be described.

The image forming optical system has a three-times zooming function where the focal length can be varied from 100 mm to 300 mm. FIG. 2A shows the positions of lens elements at a wide end (f=100 mm). FIG. 2B shows the positions of lens elements at a tele end (f=300 mm).

The image forming optical system is composed of four lens groups. When the power of the image forming optical system is varied, the fourth lens group is fixed and the first, second, and third lens groups are moved. When the focal point is adjusted, the first lens group is moved. The second lens group (image blur correction optical system) is deviated perpendicular to the optical path, an image on a focusing plane is deviated so as to correct an image blur.

Next, the theory of image blur correction will be described.

When the image forming optical system is vibrated by $\theta$ [Rad] about a forward main point thereof, an image deviation amount $d_{IM}$ is given by the following equation.

$$d_{IM}=f(1+\beta)\cdot\theta \qquad (1)$$

where f is the focal length of the image forming optical system; and $\beta$ is a image magnification. On the other hand, the ratio of the deviation amount $d_{IM}$ of an image against a deviation amount $d_L$ of the second lens group, which is an image blur correction optical system of FIGS. 2A and 2B, is given by the following equation. This ratio is referred to as an eccentric sensitivity $S_d$.

$$d_{IM}=S_d \cdot d_L \qquad (2)$$

where $d_L$ is the lens deviation amount of the second lens group.

The eccentric sensitivity $S_d$ is a function of the focal length f and the image magnification $\beta$, $S_d$ can be represented as follows.

$$Sd=Sd(f, \beta) \qquad (3)$$

The image blur compensation is accomplished by offsetting the image blur (equation (1)) caused by an angular vibration of the focusing optical system with the image deviation (equation (2)) by the lens deviation. Thus, by substituting the equations (2) and (3) into the equation (1), the following equation can be obtained.

$$d_L=(d_{IM}/S_d)=\{f\cdot(1+\beta)\cdot\theta\}/\{Sd(f, \beta)\} \qquad (4)$$

Thus, the image blur correction optical system is driven according to the lens deviation amount $d_L$ calculated by the equation (4).

Figure 2:
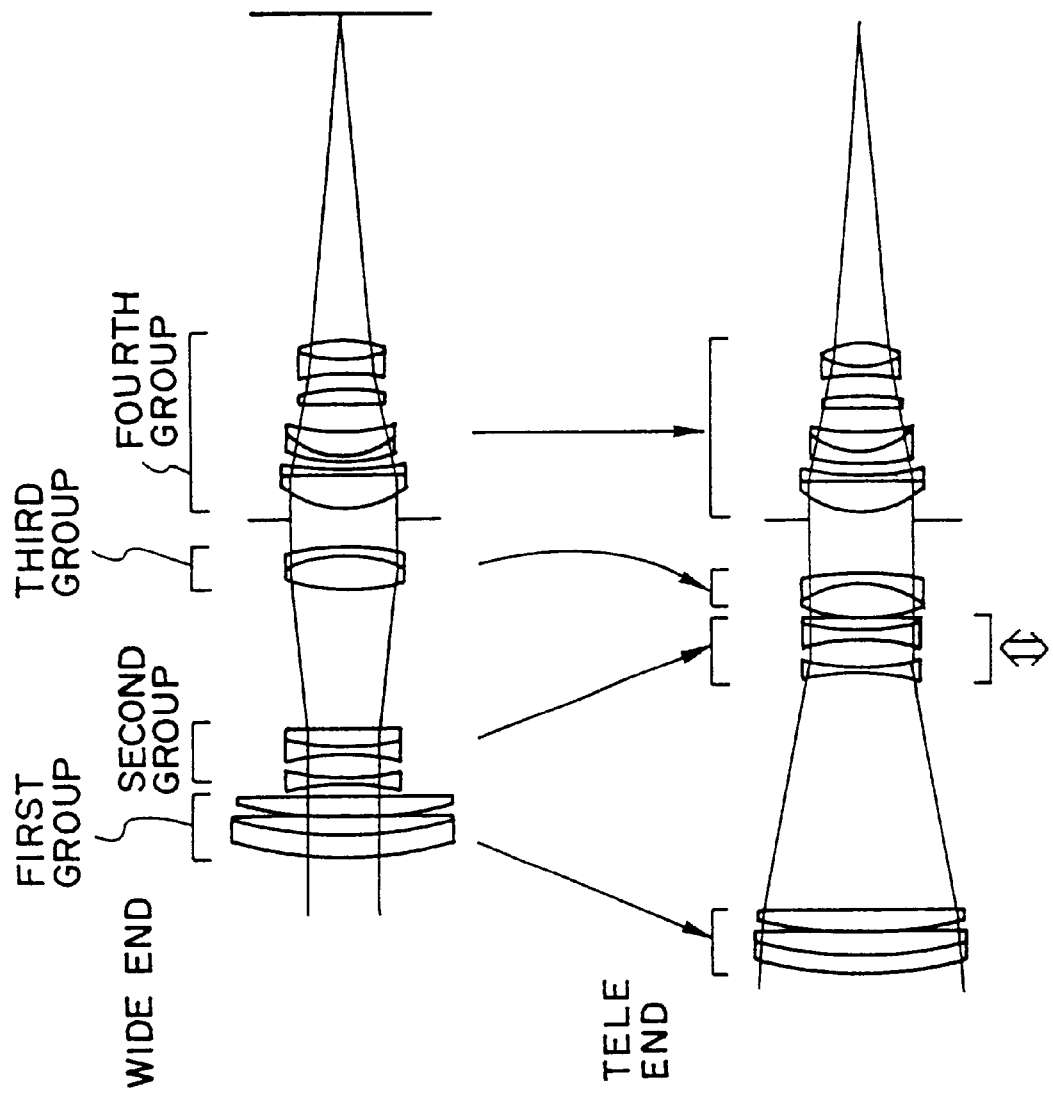
FIGS. 2A and 2B are schematic diagrams showing a zooming operation of an image forming optical system of FIG. 1.

In other words, the lens deviation amount $d_L$ is calculated by substituting the output $\theta$ of a vibration detection sensor, the parameters f and $\beta$ of the image forming optical system, and the eccentric sensitivity $S_d$ into the equation (4). The second lens group shown in FIG. 2 is eccentrically driven corresponding to the deviation amount $d_L$ so as to correct an image blur.

To calculate the lens deviation amount $d_L$ in the equation (4), the three parameters f, $\beta$, and $S_d$ are required. Now, a parameter termed an image blur prevention sensitivity k is defined as follows.

$$k=k(f, \beta)=f(1+\beta)/S_d(1+\beta) \qquad (5)$$

When the equation (5) is substituted into the equation (4), the following equation is obtained.

$$d_L=k(f, \beta)\cdot\theta \qquad (6)$$

Thus, the lens deviation amount $d_L$ can be obtained with one parameter k (f, $\beta$). In other words, the image blur correction apparatus reads k (f, $\beta$) (instead of $S_d$ (f, $\beta$)) stored in the ROM or the like corresponding to the positions of the zoom lens and (or) focus lens. In addition to the k (f, $\beta$), the image blur correction apparatus calculates the lens deviation amount $d_L$ corresponding to θ detected by the vibration detection sensor.

Thus, in this embodiment, the image blur correction is performed with the image blur prevention sensitivity k (f, β).

Next, the image blur prevention sensitivity k of this embodiment will be described in detail.

As described above, the image blur prevention sensitivity k is the function k (f, β) of the focal length f and the shooting magnification β. However, since the parameter k (f, β) is more affected by the focal length f than by the image magnification β, the influence of the k (f, β) by the focal length f will be described.

Figure 3:
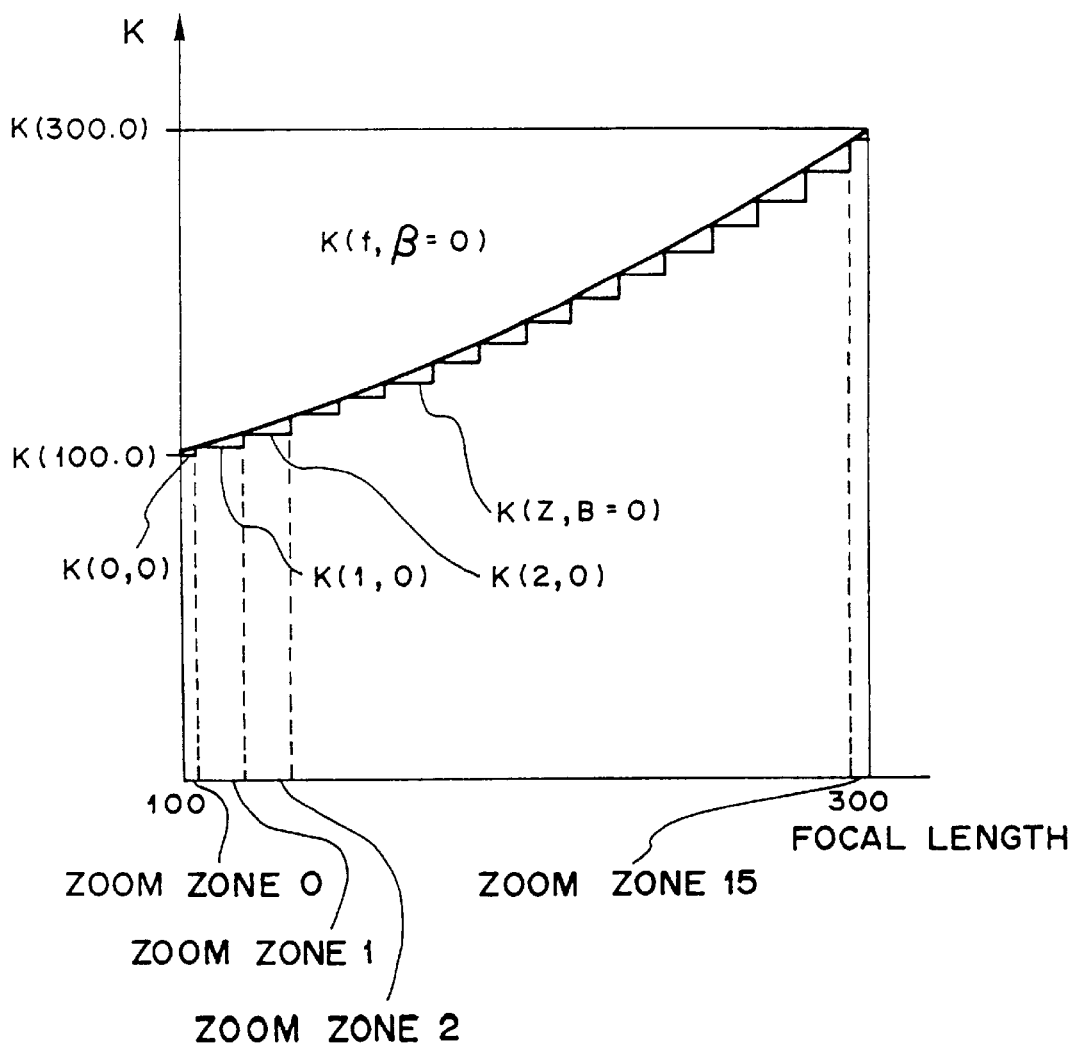
FIG. 3 is a graph for explaining an image blur prevention sensitivity of the image forming optical system of FIGS. 2A and 2B.

FIG. 3 is a graph showing the relation between the focal length f and the image blur prevention sensitivity k (f, β=0) when the distance between the object and the camera is infinitive (β=0). As shown in this drawing, the real value k (f, β) non-linearly varies from a value k (100, 0) at the wide end to a value k (300, 0) at the tele end.

On the other hand, as will be described later, a zoom position detecting encoder detects 16 divided regions of the entire zoom region from the wide end to the tele end. These 16 regions are referred to as zoom zones 0 to 15. The image blur prevention sensitivity setting values of the zoom zones 0 to 15 are denoted by K (Z, 0). These 16 K (Z, 0) data are stored as a lookup table in a ROM of an image blur correction microcomputer ICPU.

Likewise, the image blur prevention sensitivity corresponding to the position of the focus lens is set. In other words, the image blur prevention sensitivity K (Z, B) are constructed of a two-dimensional matrix having a zoom zone Z and a focus zone B. In this embodiment, since the zoom zone is divided into 16 regions and the focus zone is divided into four regions, a total of 64 image blur prevention sensitivity data are stored in the ROM.

Figure 4:
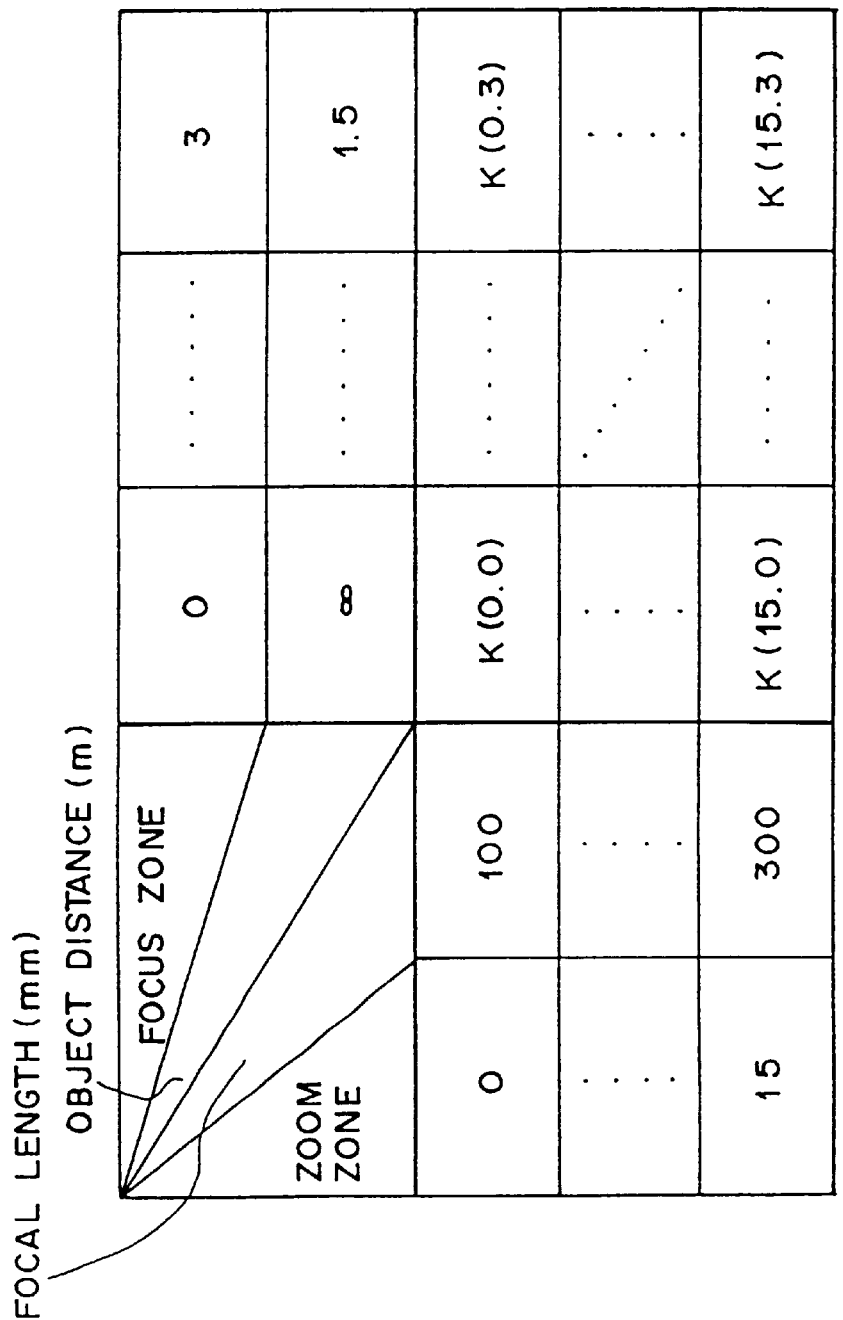
FIG. 4 is a table showing matrix data of the image blur prevention sensitivity of the image forming optical system shown in FIGS. 2A and 2B.

FIG. 4 is a table showing the matrix of the image blur prevention sensitivity K (Z, B).

Next, the image blur correction operation while the zooming operation is being performed will be described.

FIGS. 5A to 5D are graphs for explaining an image blur correction operation when the zooming operation is performed while the image blur correction is being performed. In FIGS. 5A to 5D, the horizontal axis represents a time t. FIG. 5A shows an angular deviation of hand vibration. FIG. 5B shows a variation of the image blur prevention sensitivity. FIG. 5C shows a control deviation of the image blur correction optical system. FIG. 5D shows an image blur correction error where an image blur correction has been performed, namely a deviation of image blur.

As shown in FIG. 5A, a waveform of a hand vibration is modeled with a regular sine wave. While such a vibration is taking place, a zooming operation is performed from the wide end to the tele end. Thus, as shown in FIG. 5B, the real value k (f, β) of the image blur prevention sensitivity continuously increases corresponding to the focal length f. However, while the zooming operation is being performed, the zoom amount that is output from the encoder varies in s step shape. Thus, the image blur prevention sensitivity data that is read from the lookup table of the ROM varies in the step shape at times t1, t2, and t3.

FIG. 5C shows an operation of the image blur correction optical system. In FIG. 5C, $d_L$, denoted by a dotted line, represents an ideal drive path of the lens; and $D_L$, denoted by a solid line, represents a real drive path of the lens. With the equation (6), the ideal deviation $d_L$ of the lens can be expressed as follows.

$$d_L = k(f, \beta) \cdot \theta \tag{7}$$

Thus, $d_L$ can be calculated with the hand vibration angle θ shown in FIG. 5A and the image blur prevention sensitivity k (f, β) as shown in FIG. 5B.

However, in reality, the image blur prevention sensitivity, K (Z, B) as shown in FIG. 5B, is discontinuous data. Thus, with K (Z, B), the lens deviation $D_L$ is given by the following equation.

$$D_L = K(Z, B) \cdot \theta \tag{8}$$

FIG. 5C shows the lens deviation $D_L$, denoted by a solid line.

As described above, since the image blur prevention sensitivity K (Z, B) varies in the step shape at the times t1, t2, and t3, the lens deviation $D_L$ also abruptly varies at the times t1, t2, and t3. However, since the angular deviation of hand vibration at the time t1 is just "0" (namely, zero point), the lens deviation amount is also "0" unlike at the times t2 and t3.

After the image blur correction has been performed, an image blur deviation δ may take place. This image blur deviation δ is referred to as an image blur correction error. Next, the image blur correction error will be described.

To precisely perform an image blur correction, as described above, the image blur correction optical system should be driven for the lens deviation amount $d_L$, denoted by the dotted line of FIG. 5C. With the equations (2) and (7), the deviation amount (moving amount) $d_{IM}$ of the image by the lens is given as follows.

$$d_{IM} = S_d \cdot d_L = S_d \cdot k(f, \beta) \cdot \theta \tag{9}$$

On the other hand, with the equations (2) and (8), the image deviation amount $D_{IM}$ by the real image blur correction optical system is given as follows.

$$D_{IM} = S^d \cdot D_L = S_d \cdot K(Z, B) \cdot \theta \tag{10}$$

Thus, the image blur correction error (image blur deviation δ) is given by the following equation.

$$\delta = d_{IM} - D_{IM} = S_d \cdot \{k(f, \beta) - K(Z, B)\} \cdot \theta \tag{11}$$

Thus, the image blur correction error is proportional to the eccentric sensitivity $S_d$, the image blur prevention sensitivity error (namely, the difference between the truth value and the real value "k (f, β)−K (Z, B)", and the angular deviation θ of hand vibration.

FIG. 5D shows the image blur correction error, namely the image blur deviation δ where the image blur correction has been performed. As shown in FIG. 5B, as the image blur sensitivity error by the zooming operation increases, the image blur deviation δ increases. However, since the image blur sensitivity error abruptly disappears at the times t1, t2, and t3, the deviation δ discontinuously varies.

The deviation δ is not discontinuous at the time t1. Since θ=0 in the equation (11), the image blur prevention sensitivity error does not affect the deviation δ.

When the image blur deviation as shown in FIG. 5D takes place, an abrupt variation of δ is more important than the continuous magnitude thereof. In other words, when the zooming operation is performed while the image blur correction is being performed, the image blur by the hand vibration is remarkably reduced. However, when the image blur sensitivity K (Z, B) varies at the times t2 and t3, the image abruptly moves.

When the exposure operation is performed at the times t2 and t3 regardless of the length of the exposure time, a picture with a large image blur takes place. As described above, an object of this embodiment is to solve such a problem.

FIG. 1 is a schematic diagram showing a construction of principal portions of the above-described focusing optical system of the camera according to the first embodiment of the present invention.

In FIG. 1, CMR is a camera main body. LNS is an interchangeable lens attached to the camera main body CMR.

First, the construction of the camera main body CMR will be described.

CCPU is a microcomputer disposed in the camera. The CCPU is hereinafter referred to as the in-camera microcomputer. The in-camera microcomputer CCPU is a one-chip type microcomputer that contains a ROM, a RAM, an A/D converting circuit, and a D/A converting circuit. The in-camera microcomputer CCPU performs a sequence of operations of the camera such as automatic exposure control, automatic focus adjustment, automatic film winding, and so forth corresponding to a sequence program stored in the ROM. Thus, the in-camera microcomputer CCPU communicates with peripheral circuits of the camera main body CMR and the lens LNS so as to control operations of various circuits and the lens.

LCM is a lens communication buffer circuit. The LCM supplies a power to the lens LNS through a power supply line VL. In addition, the lens communication buffer circuit LCM supplies signals of the camera main body CMR to the lens LNS through a signal line DCL and signals of the lens LNS to the camera main body CMR through a signal line DLC.

SNS is a line sensor which is constructed of a CCD or the like. The line sensor SNS detects a focal point. The line sensor SNS is simply referred to as the sensor. SDR is a drive circuit of the sensor SNS. The SDR drives the sensor SNS corresponding to a command received from the in-camera microcomputer CCPU. In addition, the drive circuit SDR receives an image signal from the sensor SNS, amplifies the received signal, and supplies the amplified image signal to the in-camera microcomputer CCPU.

Rays received from the lens LNS are entered into a photometry sensor SPC through a main mirror MM, a focusing glass PG, and a pentagonal prism PP. An output signal of the photometry sensor SPC is supplied to the in-camera microcomputer CCPU. The in-camera microcomputer CCPU performs an automatic exposure control (AE) corresponding to a predetermined program.

DDR is a switch detection and display circuit that changes an indication of a camera display member DSP corresponding to data received from the in-camera microcomputer CCPU and sends ON/OFF states of various switches (such as SWAZ) to the in-camera microcomputer CCPU.

SWAZ is an auto zoom switch. When the switch SWAZ is turned on, a zoom drive motor (which will be described later) is driven according to a predetermined program so as to perform a zooming operation.

SW1 and SW2 are switches that work in association with a release button (not shown). When the release button is pressed to a first position, the switch SW1 is turned on. When the release button is further pressed to a second position, the switch SW2 is turned on. When the switch SW1 is turned on, the in-camera microcomputer CCPU generates start signals of the photometry operation, the automatic focus adjustment operation, and the image blur correction operation. When the switch SW2 is turned on, the in-camera microcomputer CCPU performs the exposure control operation and the film winding operation.

MTR1 is a film supply motor. MTR2 is a motor that raises and lowers the mirror, and charges a shutter spring. Drive circuits MDR1 and MDR2 control forward and rearward rotations of the motors MTR1 and MTR2, respectively.

MG1 and MG2 are electromagnets that move the forward shutter and the rearward shutter, respectively. The electromagnets MG1 and MG2 are energized by amplifying transistors TR1 and TR2, respectively. The in-camera microcomputer CCPU controls the shutter STR.

Next, the construction of the lens LNS will be described.

LCPU is a microcomputer disposed in the lens LNS. The LCPU is hereinafter referred to as the in-lens microcomputer. As with the in-camera microcomputer CCPU, the in-lens microcomputer LCPU is a one-chip type microcomputer that contains a ROM, a RAM, an A/D converting circuit, and a D/A converting circuit. The in-lens microcomputer LCPU performs drive control operations of a focus lens FLNS and an aperture corresponding to commands received from the camera main body CMR through the signal line DCL. In addition, the in-lens microcomputer LCPU sends various operation states of the lens (such as the drive amount of the focusing optical system and the stop diameter of the aperture) to the camera main body CMR through the signal line DLC.

FMTR is a focus drive motor that rotates a helicoidal ring (not shown) through a gear train, thereby moving the focus lens FLNS in the direction of optical axis so as to adjust the focal point.

FDR is a drive circuit of the focus drive motor FMTR. The drive circuit FDR controls the forward and backward rotations of the focus drive motor FMTR, a brake operation thereof, and so forth.

The lens LNS of this embodiment is a forward focus type. When the in-lens microcomputer LCPU receives a focus adjustment command from the camera main body CMR, it drives the focus drive motor FMTR corresponding to commands with respect to drive amount and direction that are received along with focus adjustment command so as to move the focus lens FLNS in the direction of optical axis. The in-lens microcomputer LCPU monitors a pulse signal of an encoder circuit ENCF so as to determine the amount for which the focus lens FLNS is moved. In other words, the in-lens microcomputer LCPU counts the pulse signal of the encoder circuit ENCF and controls the motor FMTR until the focus lens FLNS is moved for a predetermined distance.

Thus, after the focus adjustment command is received from the camera main body CMR, the in-camera microcomputer CCPU does not operate with respect to the driving of the lens until the focus lens is completely moved for the predetermined distance. When necessary, the content of the counter can be sent to the camera main body CMR.

ZMTR is a zoom drive motor that rotates a zoom cam ring (not shown) so as to perform the zooming operation.

ZDR is a drive circuit of the zoom drive motor ZMTR. The drive circuit ZDR controls forward and reverse rotations of the motor ZMTR, a brake operation thereof, and so forth.

SWZM is a zoom operation switch, namely a so-called power zoom switch. When the user operates a slide member or a rotation member, drive direction and drive velocity of the zoom drive motor ZMTR are commanded. When a contact SWZM1 is turned on (closed) to a ground contact, the focus lens FLNS is moved toward the tele end at a low velocity. When a contact SWZM2 is turned on, the focus lens FLNS is moved toward the tele end at a high velocity. When a contact SWZM3 is turned on, the focus lens FLNS is moved toward the wide end at a low velocity. When a contact SWZM4 is turned on, the focus lens FLNS is moved toward the wide end at a high velocity. In these manners, the zoom drive motor ZMTR is controlled.

ENCB is an encoder that detects an absolute position of the focus lens FLNS. ENCZ is an encoder that detects the zoom position. The encoders ENCB and ENCZ send signals, which are detected by code patterns disposed on the helicoidal ring and zoom ring and detection brush, to the in-lens microcomputer LCPU and the image blur correction microcomputer ICPU, respectively When an aperture control command is received from the camera main body CMR, the in-lens microcomputer LCPU drives an aperture drive stepping motor DMTR (that is known) corresponding to an aperture stop number received along with the aperture control command.

As described above, the ICPU is an image blur correction microcomputer. The image blur correction microcomputer ICPU controls an image blur correction operation and communicates with the in-camera microcomputer CCPU through the line DLC, which is sent from the lens LNS to the camera main body CMR. In addition, the image blur correction microcomputer ICPU has a line through which signals are received and supplied from and to the in-lens microcomputer LCPU. Thus, the three microcomputers CCPU, LCPU, and ICPU can communicate with each other.

AD is an angular deviation meter that is a vibration detection sensor that detects the vibration of the lens LNS. For example, a sensor that uses the inertia of fluid in a cylindrical casing is employed as disclosed in Japanese Patent Application NO. 2-201183 or U.S. Pat. No. 5,229,603. An angular deviation output θ of the angular deviation meter AD is sent to the image blur correction microcomputer ICPU. The image blur correction microcomputer ICPU outputs control signals SAD1 and SAD2 that control response frequency characteristics of the angular deviation meter AD.

ICNT is an image blur correction control circuit that contains a filter, an amplifier, a switch, and so forth. The image blur correction control circuit ICNT drives and controls an image blur correction actuator IACT (which will be described later). The image blur correction control circuit ICNT has an input/output line through which signals are received and supplied from and to a position detection sensor PSD and the image blur correction microcomputer ICPU.

ILNS is an image blur correction optical system (second lens group of FIG. 2) that is an optical axis eccentric means. The image blur correction optical system ILNS is supported by a guide mechanism (not shown). The optical axis eccentric means ILNS is movable along a plane perpendicular to the optical axis.

IACT is an image blur correction actuator disposed in the support mechanism. The image blur correction actuator IACT is constructed of a magnetic circuit and a coil. The magnetic circuit is formed of a permanent magnet. The coil is movable in the magnetic circuit. The image blur correction actuator IACT causes the image blur correction optical system ILNS to deviate. The above mechanism is disclosed in U.S. Pat. No. 5,266,988.

PSD is a position detection sensor that detects the position of the image blur correction optical system ILNS. When rays emitted from an infrared light emitting diode IRED enter a light receiving plane of the position detection sensor PSD through a slit SLT that moves in association with the image blur correction optical system ILNS, the position detection sensor PSD generates a position signal of the image blur correction optical system ILNS. The position signal is sent to the image blur correction microcomputer ICPU and the image blur correction control circuit ICNT.

SWIS is a main switch of an image blur correction system. When the switch SWIS is turned on, the image blur correction microcomputer ICPU and the peripheral circuits are powered. Thus, the image blur correction control circuit ICNT is operated. When the switch SW1 of the camera main body CMR is turned on, this signal is sent to the in-lens microcomputer LCPU and the image blur correction microcomputer ICPU. Thus, the image blur correction actuator IACT is driven so as to start the image blur correction operation.

Next, with reference to FIGS. 6 and 7, the operations of the camera main body CMR and the lens LNS will be described.

First, with reference to a flow chart shown in FIG. 6, the operation of the camera main body CMR will be described.

When a power switch (not shown) of the camera main body CMR is turned on, the in-camera microcomputer CCPU is powered at step (001). The system advances the flow to step (002).

[Step (002)] The in-camera microcomputer CCPU determines the state of the switch SW1, which is turned on when the release button is pressed to the first position. When the switch SW1 is the off state, the system advances the flow to step (003).

[Step (003)] The in-camera microcomputer CCPU clears all control flags and variables stored in the RAM to "0". The system advances the flow to step (004).

[Step (004)] The in-camera microcomputer CCPU sends a command that causes the image blur compensation operation to be stopped to the lens LNS.

The in-camera microcomputer CCPU repeatedly executes the steps (002) to (004) until the switch SW1 is turned on or the power switch is turned off.

When the switch SW1 is turned on, the system branches the flow from the step (002) to step (011).

[Step (011)] The in-camera microcomputer CCPU performs a lens communication 1 so as to obtain information necessary for performing the exposure control (AE) and focusing adjustment control (AF). When the in-camera microcomputer CCPU sends the communication command to the in-lens microcomputer LCPU through the signal line DCL, the in-lens microcomputer LCPU sends information such as the focal length, AF sensitivity, open F number, and so forth stored in the ROM through the signal line DLC.

[Step (012)] The in-camera microcomputer CCPU sends a command that causes the image blur correction operation to be started to the lens LNS.

[Step (013)] The in-camera microcomputer CCPU executes a "photometry" subroutine for the exposure control. In other words, the in-camera microcomputer CCPU receives the output of the photometry sensor SPC shown in FIG. 1 from the analog input terminal and performs the A/D conversion for the received signal so as to obtain a digital photometry value Bv.

[Step (014)] The in-camera microcomputer CCPU executes an "exposure calculation" subroutine so as to obtain an exposure control value. The in-camera microcomputer CCPU determines a shutter value Tv and an aperture value Av corresponding to APEX operation expression "Av+Tv=Bv+Sv" and a predetermined program flow and stores these values at predetermined addresses of the RAM.

[Step (015)] The in-camera microcomputer CCPU performs a lens communication 2. The in-camera microcomputer CCPU determines whether or not the value of the image blur sensitivity K (Z, B) has been just changed. The in-camera microcomputer CCPU causes the image blur correction microcomputer ICPU to sends an image blur sensitivity flag FLK and receives this flag FLK. As will be described later, in a predetermined time period just after the value of the image blur prevention sensitivity K (Z, B) has been changed, "FLK=1" is set. Otherwise, "FLK=0" is set.

[Step (016)] The in-camera microcomputer CCPU determines the value of the flag FLK. When "FLK=1", namely just after the value of the image blur prevention sensitivity K (Z, B) has been changed, as shown in FIG. 5D, an abrupt image blur correction error may take place. Thus, the system does not advance the flow to the next step, but returns the flow to the step (015). The in-camera microcomputer CCPU repeatedly executes the steps (015) and (016). When "FLK= 0", the system advances the flow to step (017).

[Step (017)] The in-camera microcomputer CCPU executes an "image signal input subroutine". The in-camera microcomputer CCPU controls the AF sensor for start, stop, and transmission of an image signal and inputs the image information signal detected by the sensor SNS.

[Step (018)] The in-camera microcomputer CCPU calculates a defocus amount of the focus lens FLNS corresponding to the input image signal. In other words, the in-camera microcomputer CCPU executes a "focal point detection calculation" subroutine.

Since the subroutine flows of the steps (017) and (018) are disclosed in Japanese Patent Application No. 61-160824 and so forth, the description of these subroutine flows are omitted.

[Step (019)] The in-camera microcomputer CCPU sends the focus lens drive command to the lens LNS. At this step, the in-camera microcomputer CCPU sends the number of drive pulses of the focus lens FLNS calculated by the camera main body CMR at the step (018) to the in-lens microcomputer LCPU. Thereafter, the in-lens microcomputer LCPU drives and controls the focus drive motor FMTR corresponding to a predetermined acceleration/deceleration curve.

[Step (020)] The in-camera microcomputer CCPU determines the state of the switch SW2, which is turned on when the release button is pressed to the second step position. When the determined result of the switch SW2 is off, the system returns the flow to the step (002) so as to repeat the above-described flow. When the determined result of the switch SW2 is on, the in-camera microcomputer CCPU performs a release operation in step (031) or later.

[Step (031)] The in-camera microcomputer CCPU sends the stop command of focusing actuator, stop-down command of the aperture, and stop-down number of the aperture to the in-lens microcomputer LCPU.

[Step (032)] The in-camera microcomputer CCPU controls the rotation of the motor MTR2 so as to raise the quick return mirror MM.

[Steps (033) and (034)] As with the steps (015) and (016), the in-camera microcomputer CCPU determines whether or not the value of the image blur prevention sensitivity K (Z, B) has been changed. When the determined result is "FLK= 1", namely just after the value of the image blur prevention sensitivity K (Z, B) has been just changed, since the image blur correction error largely varies and thereby an abrupt image motion takes place, the in-camera microcomputer CCPU does not perform the exposure operation, but repeatedly executes the steps (033) and (034).

When the determined result at the step (034) is "FLK=0", the system advances the flow to step (035).

[Step (035)] The in-camera microcomputer CCPU energizes the electromagnets MG1 and MG2 for moving the forward shutter and rearward shutter and drives the shutter STR so as to perform the exposure operation.

[Step (036)] The in-camera microcomputer CCPU sends an aperture restore command to the lens LNS.

[Step (037)] The in-camera microcomputer CCPU controls the rotation of the motor MTR2 so as to restore the quick return mirror MM to the original position and charge the shutter spring.

[Step (038)] The in-camera microcomputer CCPU controls the rotation of the motor MTR1 so as to wind up the film.

With these steps, one release operation is completed. The system returns the flow to the step (002).

Next, with reference to a flow chart shown in FIG. 7, the image blur correction operation performed by the image blur correction microcomputer ICPU in the lens LNS will be described.

[Step (101)] When the image blur correction main switch SWIS is turned on, the image blur correction microcomputer ICPU, the peripheral circuits, the angular deviation meter AD, and so forth are powered. Thus, the image blur correction microcomputer ICPU executes the program starting from step (102) shown in FIG. 7.

[Step (102)] The image blur correction microcomputer ICPU clears all flags and variables thereof to "0".

[Step (103)] The image blur correction microcomputer ICPU determines whether or not an image blur correction (IS) start command has been received from the camera main body CMR. When the image blur correction microcomputer ICPU has not received the IS start command from the camera main body CMR, the system advances the flow to step (104).

[Step (104)] The image blur correction microcomputer ICPU stops the driving of the image blur correction actuator IACT and fixes the image blur correction optical system ILNS at the zero, in other words, the center or original, position.

While the image blur correction microcomputer ICPU is executing the steps (103) and (104), if it receives the IS start command from the camera main body CMR, the system branches the flow from the step (103) to step (111).

[Step (111)] The image blur correction microcomputer ICPU causes the zoom encoder ENCZ and the focus encoder ENCB to detect the present zoom zone and the focus zone, respectively.

[Step (112)] The image blur correction microcomputer ICPU reads the value of the image blur prevention sensitivity K (Z, B) corresponding to the zones detected at the step (111) from the lookup table of the ROM and stores the value in a register KNEW that stores the new value of the image blur prevention sensitivity.

[Step (113)] The image blur correction microcomputer ICPU determines whether or not the value of a register KOLD that stores the old value of the image blur prevention sensitivity K (Z, B). When the image blur correction microcomputer ICPU executes the step (103) first time, since "KOLD=0", the system advances the flow to step (114).

[Step (114)] The image blur correction microcomputer ICPU stores the value stored in the register KNEW set at the step (112) to the register KOLD. The system advances the flow to step (115).

When the image blur correction microcomputer ICPU has executed the step (113) twice or more times, since the register KOLD stores a value, the system branches the flow from the step (113) to step (115).

[Step (115)] The image blur correction microcomputer ICPU determines whether or not the value of the image blur prevention sensitivity K (Z, B) has been changed. In other words, the image blur correction microcomputer ICPU compares the old value (the value stored in the register KOLD) with the new value (the value stored in the register KNEW) read at the step (112). When these values are matched, the system advances the flow to step (119). When these values are not matched, the system advances the flow to step (116).

Next, the case where the value of K (Z, B) has not been changed (namely, the old value and the new value are matched) will be described.

[Step (119)] The image blur correction microcomputer ICPU substitutes the new value of the image blur prevention sensitivity (the value stored in the register KNEW) into a register K.

[Step (120)] The image blur correction microcomputer ICPU calculates the deviation amount $D_L$ of the image blur correction optical system ILNS corresponding to the equation (8).

[Step (121)] The image blur correction microcomputer ICPU drives and controls the image blur correction optical system ILNS corresponding to the deviation amount $D_L$.

[Step (122)] The image blur correction microcomputer ICPU determines whether or not the request of the lens communication 2 has been received from the camera main body CMR. When the lens communication 2 has been received, the image blur correction microcomputer ICPU sends the value of a flag FLK (which will be described later) to the in-camera microcomputer CCPU.

[Step (123)] The image blur correction microcomputer ICPU determines whether or not an IS stop command has been received from the camera. When the IS stop command has been received, the system returns the flow to the steps (103) and (104). The image blur correction microcomputer ICPU stops the image blur correction operation. When the IS stop command has not been received, the system returns the flow to the step (111). The image blur correction microcomputer ICPU repeatedly executes the image blur correction flow.

Next, the case where the zooming operation or the focusing operation is performed while the image blur correction operation is being performed and thereby the value of the image blur prevention sensitivity K (Z, B) is changed will be described. In other words, in this case, the old value (the value stored in the register KOLD) and the new value (the value stored in the register KNEW) are not matched.

When the image blur correction microcomputer ICPU has obtained the new value of the image blur prevention sensitivity K (Z, B) at the steps (111) and (112), has stored the value in the register KNEW, and the system has advanced the flow from the step (113) to the step (115), if the value of the image blur prevention sensitivity K (Z, B) has been changed, since "KOLD≠KNEW", the system advances the flow from the step (115) to the step (116).

[Step (116)] The image blur correction microcomputer ICPU determines the value of the flag FLK that represents whether or not a timer (which will be described later) has started the time counting. The flag FLK represents the flags used at the steps (016) and (034) shown in FIG. 6. When the value of the flag FLK is "0", the system advances the flow to step (117). In other words, when the image blur correction microcomputer ICPU has determined that the value of the image blur prevention sensitivity K (Z, B) has been changed at the step (115) and the timer T has not started, the system advances the flow to step (117).

[Step (117)] The image blur correction microcomputer ICPU starts the timer T. The timer T starts the time counting.

[Step (118)] The image blur correction microcomputer ICPU sets the flag FLK, which represents that the timer is counting, to "1".

The system advances the flow to steps (119) to (123) and returns the flow to the step (111).

After the image blur correction microcomputer ICPU has executed the above-described flow and returned to the step (115), since the value stored in the register KOLD is not equal to the value stored in the register KNEW, the system advances the flow from the step (115) to the step (116). Since the value of the flag FLK has been set to "0" at the step (118), the system branches the flow from the step (116) to step (131).

[Step (131)] The image blur correction microcomputer ICPU compares the value of the timer T, which is counting, with a timer upper limit value To.

The timer upper limit value To is a time period for which an abrupt motion of the image blur correction optical system ILNS that takes place corresponding to a change of the value of the image blur prevention sensitivity shown in FIGS. 5A to 5D stops. The timer upper limit value To is predetermined corresponding to dynamic characteristics of the image blur correction optical system ILNS. Since the image blur correction optical system ILNS requires high dynamic characteristics, the timer upper limit value To is predetermined to a relatively short time period such as 100 msec. On the other hand, this operating system is constructed to have high speed responsibility, it takes several micro seconds to execute each step. So exectution time of these several steps is much shorter than the limit value To.

When the system advances the flow from the step (116) to the step (131) first time, since "T<To", the system branches the flow from the step (131) to the step (119). The image blur correction microcomputer ICPU controls the image blur correction in the steps (119) to (123). The image blur correction microcomputer ICPU preforms the image blur correction operation with the new value of the image blur prevention sensitivity (the value stored in the register KNEW). At this point, the flag FLK has been set to "1".

After the system has repeatedly executed the above-described flow, when "T≧To", the system advances the flow from the step (131) to step (132).

[Step (132)] The image blur correction microcomputer ICPU resets the timer T to "0". The system advances the flow to step (133).

[Step (133)] The image blur correction microcomputer ICPU resets the flag FLK to "0". The image blur correction microcomputer ICPU generate a signal that the timer T stops.

[Step (134)] The image blur correction microcomputer ICPU stores the new value (stored in the register KNEW) of the image blur prevention sensitivity to the register KOLD. The system advances the flow to the step (119).

When the system returns the flow to the step (115) through the steps (123) and (111), since "KOLD=KNEW", the system advances the flow to the step (119).

In other words, according to the above-described flow, while the image blur prevention correction operation is being controlled, when the value of the image blur prevention sensitivity K (Z, B) is changed, the image blur correction microcomputer ICPU sets the flag FLK to "1" and sends the value of the flag FLK to the camera corresponding to a communication request therefrom.

Since the operation of the in-lens microcomputer LCPU in the lens LNS does not directly relate to the present invention, the description is omitted.

The flows shown in FIGS. 6 and 7 can be summarized as follows.

1) When the switch SW1 of the camera is turned on, the in-camera microcomputer CCPU starts the AE and AF operations and the in-lens microcomputer LCPU starts the image blur correction operation.

2) When the in-lens microcomputer LCPU has determined that the value of the image blur prevention sensitivity has been changed while the image blur correction operation is being corrected, it sets the flag FLK to "1" for the predetermined time period.

3) Before storing an image for AF operation or starting an exposure operation for a film, the in-camera microcomputer CCPU issues a flag FLK transmission request to the image blur correction microcomputer ICPU. While "FLK=1", namely an abrupt image blur correction error is taking place, the in-camera microcomputer CCPU prohibits the image from being stored in the AF sensor SNS and the exposure operation for the film from being performed.

Thus, since the image is not stored in the AF sensor SNS or the exposure operation is not performed while the abrupt image blur correction error is taking place, an AF error can be prevented or a picture with an image blur can be prevented from being taken.

Second Embodiment

According to the first embodiment, in the predetermined time period after the value of the image blur prevention sensitivity has been changed, an AF image storage or the exposure operation for a film is prohibited from being performed. However, in the first embodiment, when such a prohibition operation works, the AF image is stored or the exposure operation is responded with a delay for the prohibition time period.

To solve such a problem, in a second embodiment of the present invention, when the value of the image blur prevention sensitivity is changed while the AF image is being stored or the exposure operation is being performed, the image blur prevention sensitivity is prohibited from being changed until the AF image is stored or the exposure operation is completed.

Next, with reference to flow charts shown in FIGS. 8 an 9, an operation of the second embodiment will be described. Since the construction of the camera (camera main body CMR and the lens LNS) according to the second embodiment is the same as the construction of the camera according to the first embodiment, the description thereof is omitted.

FIG. 8 is a flow chart showing an operation of an in-camera microcomputer CCPU according to the second embodiment of the present invention.

The steps (015), (016), (017), (033), (034), and (035) of FIG. 6 according to the first embodiment are substituted with steps (041), (042), (043), (051), (052), and (053) in the second embodiment, respectively. Since the other steps in the first embodiment are the same as the other steps in the second embodiment, the same steps are denoted by the same step numbers and their description is omitted.

In FIG. 8, after an in-camera microcomputer CCPU has performed the exposure calculation at the step (014), the system advances the flow to step (041).

[Step (041)] The in-camera microcomputer CCPU sends an image blur prevention sensitivity change prohibition command to an image blur correction microcomputer ICPU of a lens LNS.

[Step (042)] As with the step (017) shown in FIG. 6, the in-camera microcomputer CCPU stores and reads an image of a sensor SNS. After the image has been stored, the system advances the flow to step (043).

[Step (043)] The in-camera microcomputer CCPU sends an image blur prevention sensitivity change prohibition cancel command to the image blur correction microcomputer ICPU. The system advances the flow to a step (018) at which the in-camera microcomputer CCPU executes a "focal point detection calculation" subroutine.

[Steps (051) to (053)]

Before or after the in-camera microcomputer CCPU controls a shutter at the step (052), the in-camera microcomputer CCPU sends the image blur prevention sensitivity change prohibition command at the step (051) and the image blur prevention sensitivity change prohibition cancel command at the step (053) to the inlens microcomputer LCPU.

Thus, while an AF image is being stored or an exposure operation is being performed, the in-camera microcomputer CCPU sends the image blur prevention sensitivity change prohibition command to the lens LNS.

Figure 9:
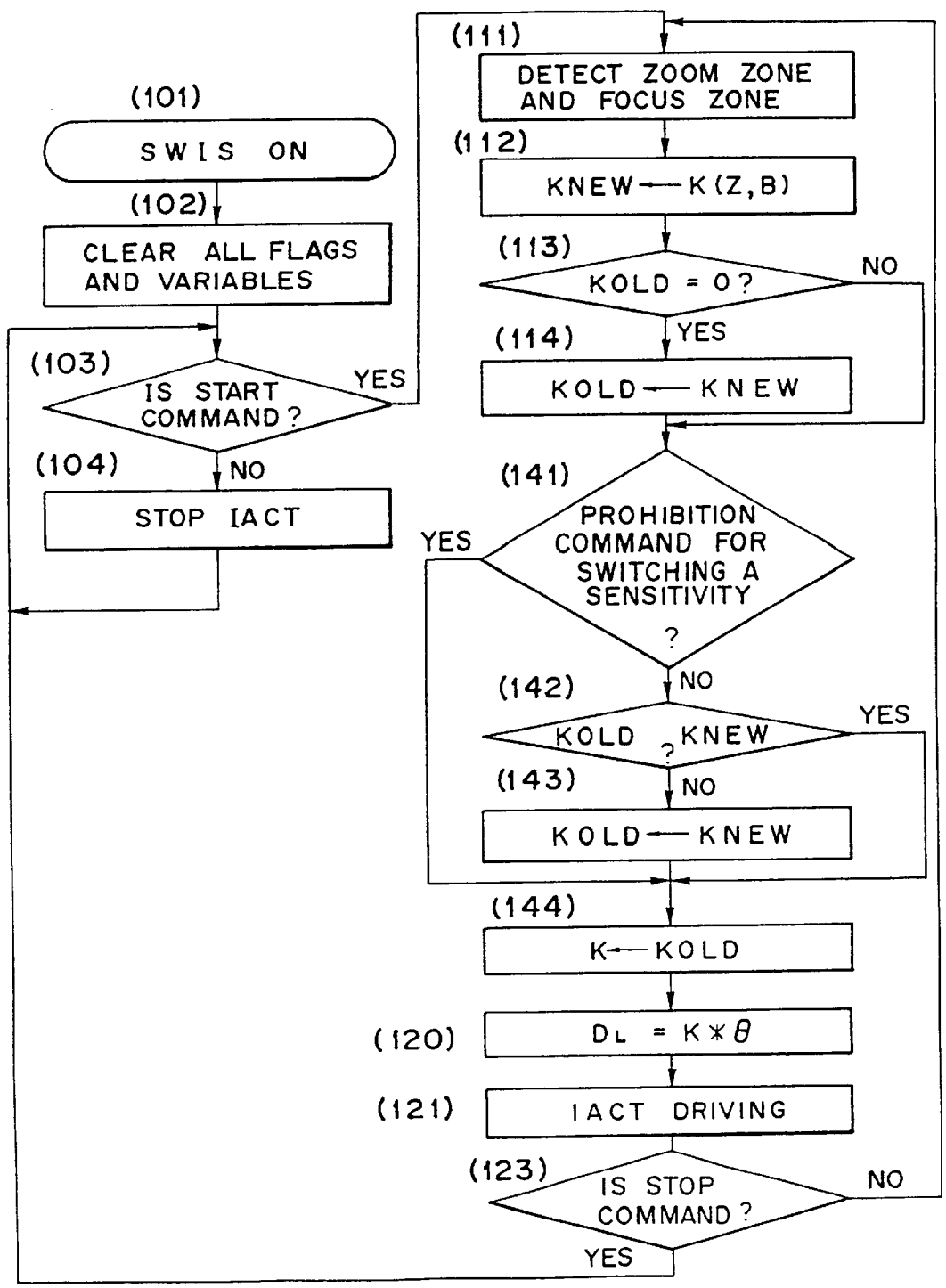
FIG. 9 is a flow chart showing an operation of an image blur correction microcomputer according to the second embodiment of the present invention.

FIG. 9 is a flow chart showing an operation of the image blur correction microcomputer ICPU of the lens LNS according to the second embodiment of the present invention.

The steps (115) to (119) and the steps (131) to (134) shown in FIG. 7 of the first embodiment are substituted with steps (141) and (142) and steps (143) and (144) shown in FIG. 9 of the second embodiment, respectively. In addition, the step (122) of the first embodiment is omitted in the second embodiment. Since the other steps in the first embodiment are the same as the other steps in the second embodiment, the same steps are represented by the same step number. Only different points are described.

After the image blur correction microcomputer ICPU has executed step (113) or (114) shown in FIG. 9, the system advances the flow to step (141).

[Step (141)] The image blur correction microcomputer ICPU determines whether or not it has received an image blur prevention sensitivity change prohibition command from the camera main body CMR. When the image blur correction microcomputer ICPU has not received the image blur prevention sensitivity change prohibition command, the system advances the flow to the step (142).

[Step (142)] The image blur correction microcomputer ICPU compares a value stored in a register KOLD with a value stored in a register KNEW. In other words, the image blur correction microcomputer ICPU determines whether the value of the image blur prevention sensitivity has been changed. When the value of the image blur prevention sensitivity has not been changed, since "KOLD=KNEW", the system advances the flow to step (144). When the value of the image blur prevention sensitivity has been changed, the system advances the flow to step (143).

[Step (143)] The image blur correction microcomputer ICPU updates the value of the image blur prevention sensitivity stored in the register KOLD. The system advances the flow to step (144).

[Step (144)] The image blur correction microcomputer ICPU substitutes the value stored in the register KOLD into a register K that stores the image blur prevention sensitivity K. The system advances the flow to step (120). The image blur correction microcomputer ICPU calculates a deviation amount $D_L$ of the image blur correction optical system.

Although the image blur correction microcomputer ICPU substitutes the old value (the value stored in the register KOLD) into the register K at the step (144), if the system advances the flow through the steps (142) and (143), the value stored in the register KOLD is equal to the value stored in the register KNEW at the step (144). In other words, the image blur correction microcomputer ICPU controls an image blur correction optical system ILNS corresponding to the new value of the image blur prevention sensitivity.

When the image blur prevention sensitivity change prohibition command has been received at the step (141), the system advances the flow to the step (144). Thus, even if the value of the image blur prevention sensitivity has been changed, the image blur correction microcomputer ICPU performs the image blur correction operation corresponding to the old value of the image blur prevention sensitivity (the value stored in the register KOLD). The image blur correction microcomputer ICPU repeatedly executes the image blur correction control operation in the steps (111) to (123). When the image blur prevention sensitivity change prohibition cancel command is received from the camera, the system advances the flow from the step (141) to the step (142). If the value of the image blur prevention sensitivity has been changed while the system is advancing the flow from the step (141) to the step (144), since "KOLD≠KNEW", the image blur correction microcomputer ICPU updates the value stored in the register KOLD at the step (143). At this point, the image blur correction microcomputer ICPU performs the image blur correction control corresponding to the new value of the image blur prevention sensitivity.

In the second embodiment, since the operation of the in-lens microcomputer LCPU of the lens LNS does not directly relate to the present invention, the description is omitted.

With reference to the flows shown in FIGS. 8 and 9, the operations of the in-camera microcomputer CCPU and the image blur correction microcomputer ICPU are summarized as follows.

1) When the switch SW1 is turned on, the in-camera microcomputer CCPU starts an AE operation and an AF operation. The in-lens microcomputer LCPU starts the image blur correction operation.

2) While an image of the focus detection sensor is being stored or the exposure operation is being performed, the in-camera microcomputer CCPU sends the image blur prevention sensitivity change prohibition command to the lens LNS.

3) While receiving the image blur prevention sensitivity change prohibition command, even if the value of the image blur prevention sensitivity is changed, the image blur correction microcomputer ICPU performs the image blur correction control operation corresponding to the old value. After the image blur prevention sensitivity change prohibition command is cancelled, the image blur correction microcomputer ICPU uses the new value of the image blur prevention sensitivity.

Thus, while an AF image is being stored or the exposure operation is being performed, an abrupt image blur correction error is prevented from taking place.

Third Embodiment

In the first and second embodiments, while the value of the image blur prevention sensitivity is being changed, an abrupt image blur correction error does not take place during a predetermined period. In addition, while the value of the image blur prevention sensitivity is being changed, an AF image storage operation or the exposure operation is not performed. On the other hand, when the value of the image blur prevention sensitivity is changed, as shown in FIG. 5C, since the image blur correction optical system ILNS is largely moved quickly, the image blur correction actuator IACT consumes a large amount of electricity. Thus, when the image blur correction actuator LACT is operating, if another actuator is activated, a much larger amount of electricity is consumed. Thus, these actuators may do not properly work. Alternatively, since the microcomputers and so forth are not properly powered, the camera may not properly operate.

To solve such a problem, in a third embodiment of the present invention, when a focus drive motor FMTR is activated or an aperture drive stepping motor DMTR is driven, the value of the image blur prevention sensitivity is prevented from being changed.

Figure 10:
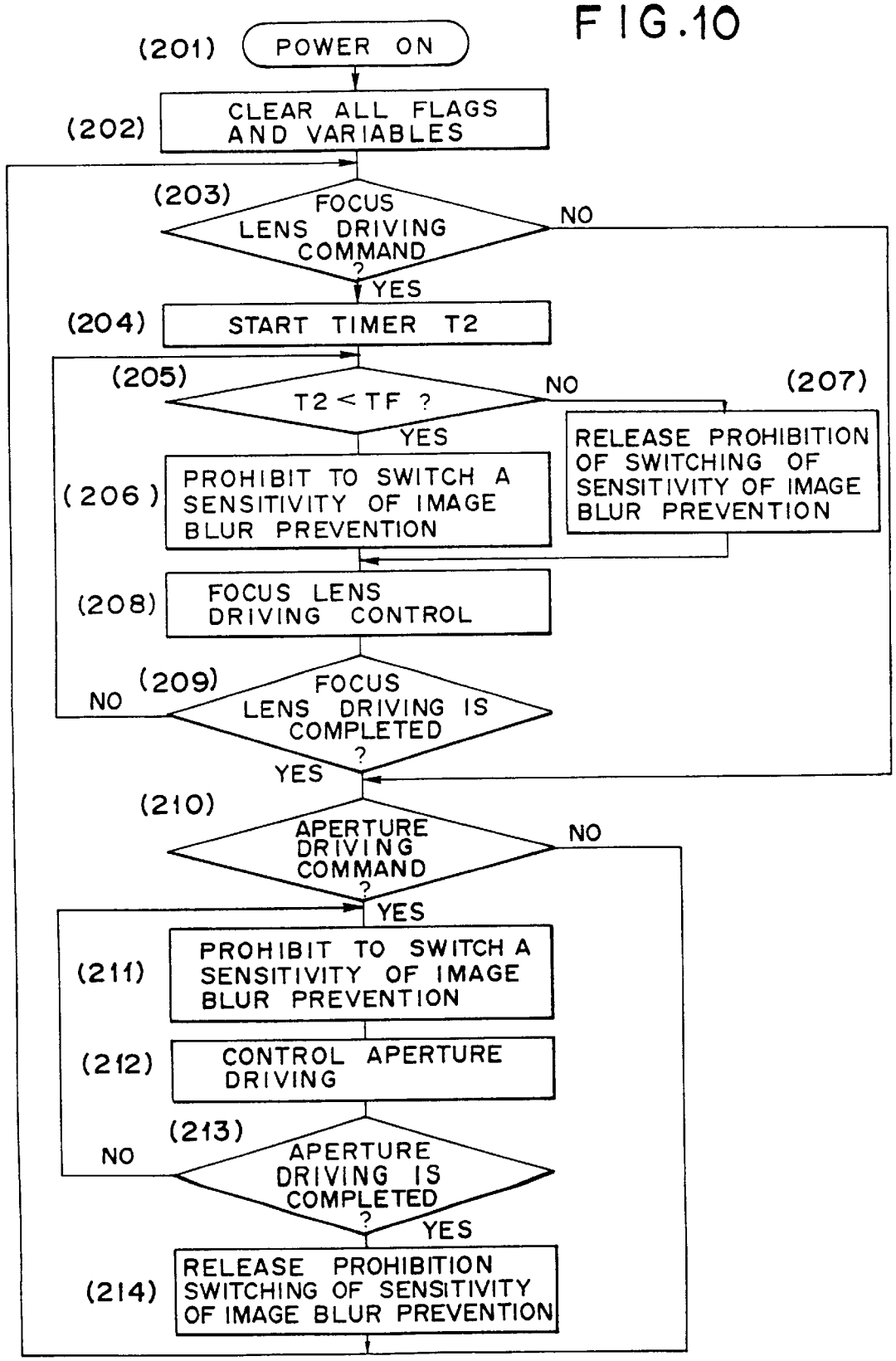
FIG. 10 is a flow chart showing an operation of a microcomputer disposed in a lens according to a third embodiment of the present invention.

The operation of an in-camera microcomputer CCPU in the third embodiment is the same as the operation of the in-camera microcomputer CCPU in the second embodiment. In addition, the operation of an image blur correction microcomputer ICPU in the third embodiment is the same as the operation of the image blur correction microcomputer ICPU in the second embodiment. Thus, with reference to a flow chart shown in FIG. 10, an operation of only an in-lens microcomputer LCPU will be described.

When a power switch of a camera main body is turned on, a lens circuit is powered at step (201). The in-lens microcomputer LCPU executes operations in steps (202) or later.

[Step (202)] The in-lens microcomputer LCPU clears all control flags and variables stored in an RAM thereof to "0". The system advances the flow to step (203).

[Step (203)] The in-lens microcomputer LCPU determines whether or not a focus lens drive command has been received from the camera main body CMR. When the focus lens drive command has not been received from the camera main body CMR, the system branches the flow to step (210). When the focus lens drive command has been received from the camera main body CMR, the system advances the flow to step (204).

[Step (204)] The in-lens microcomputer LCPU starts a timer T2 that counts a time after the focus drive motor FMTR is driven. The system advances the flow to step (205).

[Step (205)] The in-lens microcomputer LCPU compares a value of the timer T2 with a timer's predetermined value TF.

The predetermined value TF is a time period for which a large amount of current flows when the focus drive motor FMTR is driven. When "T2<TF", the in-lens microcomputer LCPU determines that a large current flows in the focus drive motor FMTR. The system advances the flow to step (206).

[Step (206)] The in-lens microcomputer LCPU sends an image blur prevention sensitivity change prohibition command to the image blur correction microcomputer ICPU. The system advances the flow to step (208).

When the in-lens microcomputer LCPU has determined that "T2≧TF" at the step (205), the system advances the flow to step (207).

[Step (207)] The in-lens microcomputer LCPU cancels the image bur prevention sensitivity change prohibition command. The system advances the flow to step (208).

[Step (208)] The in-lens microcomputer LCPU drives and controls the focus drive motor FMTR. The system advances the flow to step (209).

[Step (209)] The in-lens microcomputer LCPU determines whether or not the focus drive motor FMTR has been completely driven. When the focus drive motor FMTR has not been completely driven, the system returns the flow to the step (205). When the focus drive motor FMTR has been completely driven, the system advances the flow to step (210).

[Step (210)] The in-lens microcomputer LCPU determines whether or not an aperture drive command has been received from the camera main body CMR. When the aperture drive command has not been received from the camera main body CMR, the system returns the flow to the step (203). When the aperture drive command has been received from the camera main body CMR, the system advances the flow to step (211).

[Step (211)] As with the step (206), the in-lens microcomputer LCPU sends the image blur prevention sensitivity change prohibition command to the image blur correction microcomputer ICPU.

[Step (212)] The in-lens microcomputer LCPU drives and controls the aperture drive stepping motor DMTR. The system advances the flow to step (213).

[Step (213)] The in-lens microcomputer LCPU determines whether or not the aperture drive operation has been completed. When the aperture drive operation has not been completed, the system returns the flow to the step (211). When the aperture drive operation has been completed, the system advances the flow to step (214).

[Step (214)] As with the step (207), the in-lens microcomputer LCPU sends the image blur prevention sensitivity change prohibition cancel command to the image blur correction microcomputer ICPU. The system returns the flow to the step (203).

Thus, according to the above-described flow, in the predetermined time period TF after the focus drive motor FMTR is driven or while the aperture is being driven, the value of the image blur prevention sensitivity is prohibited from being changed. Consequently, a plurality of actuators can be prevented from being driven at the same time.

In the third embodiment, even if the focus drive motor FMTR is substituted with another actuator for example a zoom drive motor ZMTR, the same effect can be obtained.

Fourth Embodiment

In the first to third embodiments, when the value of the image blur prevention sensitivity is changed, an image blur correction error is prevented from taking place. In addition, when the value of the image blur prevention sensitivity is changed, the exposure operation or the AF image storage of the sensor SNS are prevented from being performed. Moreover, when the value of the image blur prevention sensitivity is changed, another actuator is prohibited from being driven. However, in these embodiments, the abrupt image blur correction error cannot be removed.

In a fourth embodiment of the present invention, the abrupt image blur correction error is prevented from taking place.

Next, with reference to FIGS. 11A to 11D, an operation of the fourth embodiment will be described.

FIGS. 11A to 11D accord with FIG. 5, which was used to describe the first embodiment. The difference between the fourth embodiment shown in FIGS. 11A to 11D and the first embodiment shown in FIG. 5 is a changing operation the value of the image blur prevention sensitivity K (Z, B).

In the first embodiment, as the zooming operation is performed, the value of the image blur prevention sensitivity K (Z, B) was abruptly changed at the times t1, t2, and t3. However, in the fourth embodiment, as denoted by one-dash lines of FIG. 11B, the value of the image blur prevention sensitivity K (Z, B) gradually varies from the times t1, t2, and t3 to a time tc. Thus, the deviation of the image blur correction optical system ILNS and the image blur deviation (namely, the image blur correction error) are prevented from abruptly varying as shown in FIGS. 11C and 11D.

Figure 12:
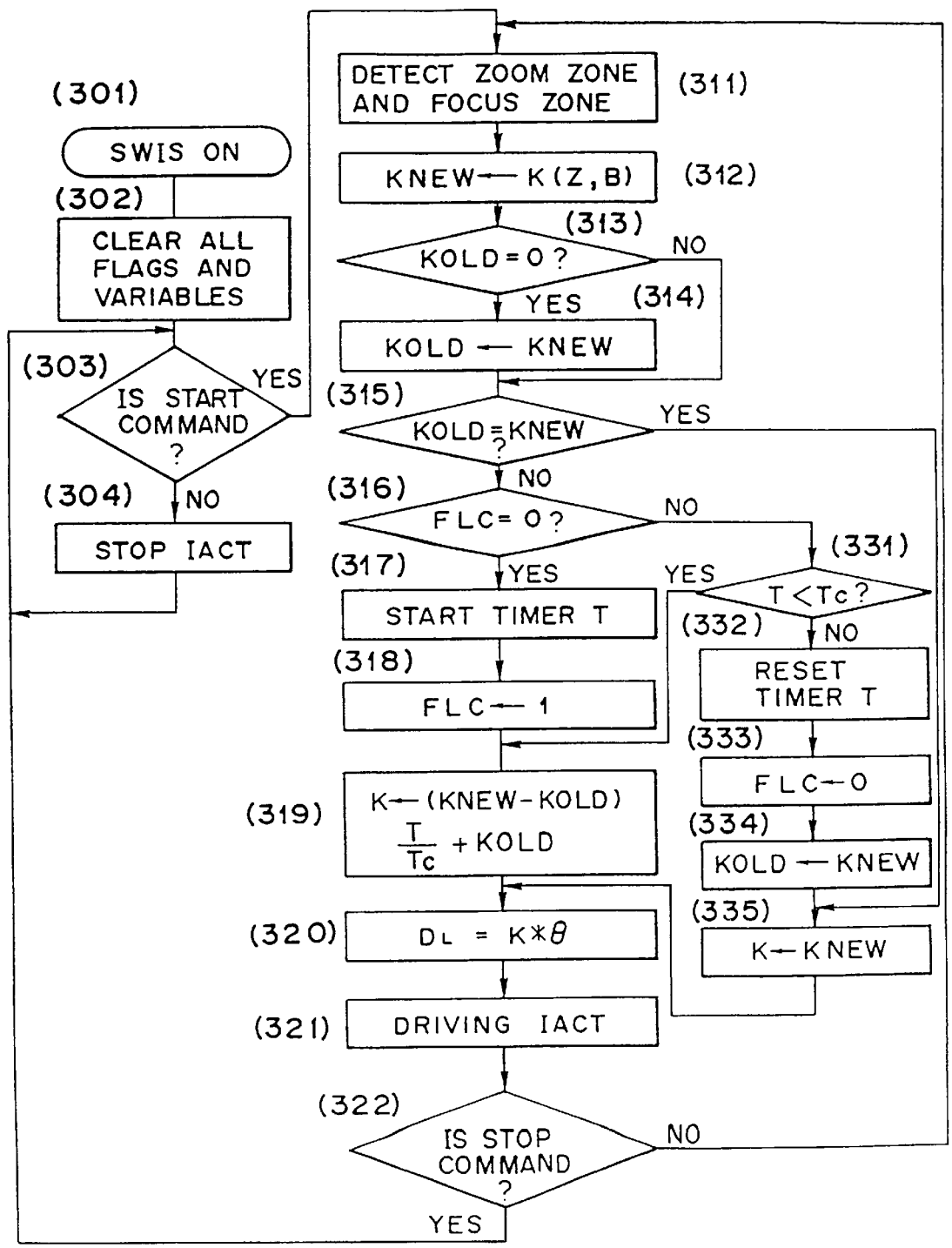
FIG. 12 is a flow chart showing an operation of an image blur correction microcomputer according to the fourth embodiment of the present invention.

FIG. 12 is a flow chart showing an operation of an image blur correction microcomputer ICPU. Many portions of the flow shown in FIG. 12 are the same as those of the flow shown in FIG. 7 of the first embodiment. Registers KNEW, KOLD, and timer T shown in FIG. 12 can be used with the same definitions as those shown in FIG. 7. Thus, the description of such redundant portions is omitted.

After an image blur correction main switch SWIS is turned on, the image blur correction microcomputer ICPU executes operations in steps (301) and (302). When the image blur correction microcomputer ICPU has not received an IS start command from a camera, it repeatedly executes operations in steps (303) and (304).

When the image blur correction microcomputer ICPU receives the IS start command from the camera main body CMR, the system advances the flow to step (311). The image blur correction microcomputer ICPU detects a zoom zone and a focus zone. The image blur correction microcomputer ICPU reads the value of an image blur prevention sensitivity K (Z, B) corresponding to the detected zone from a lookup table stored in a ROM thereof and stores the value in a register KNEW. The system advances the flow to step (313).

The image blur correction microcomputer ICPU determines a value stored in a register KOLD at the step (313). When the value stored in the register KOLD is "0", the image blur correction microcomputer ICPU stores the value stored in the register KNEW at step (314). When the value is not "0", the system advances the flow to step (315) without passing through the step (314). The image blur correction microcomputer ICPU compares the present value of the image blur prevention sensitivity (the value stored in the register KNEW) with the old value (the value stored in the register KOLD). When these values are matched, the system advances the flow to step (335). The image blur correction microcomputer ICPU stores the value stored in the register KNEW in a register K.

The system advances the flow to the step (320) from the step (335). The image blur correction microcomputer ICPU calculates a control deviation $D_L$ of the image blur compensation optical system corresponding to a vibration deviation θ received from an angular deviation meter AD and the value of the image blur prevention sensitivity K obtained at the step (334). The image blur correction microcomputer ICPU drives and controls an image blur correction actuator IACT at step (321). When the IS stop command has not been received from the camera main body CMR, the system returns the flow to the step (311). The image blur correction microcomputer ICPU repeatedly executes the image blur correction flow.

While the image blur correction operation is being performed, if the value of the image blur prevention sensitivity is changed by a zooming operation or a focusing operation, the system advances the flow from the step (315) to step (316). The image blur correction microcomputer ICPU determines a value of a flag FLC that represents whether or not the image blur prevention sensitivity is continuously changed. However, initially, since "FLC=0", the system advances the flow to step (317). The image blur correction microcomputer ICPU starts a timer T that counts a time after the value of the image blur prevention sensitivity is changed. The image blur correction microcomputer ICPU sets the flag FLC to "1" at step (318). The image blur correction microcomputer ICPU calculates the value of the image blur prevention sensitivity K corresponding to the following equation at step (319).

$$K=(KNEW-KOLD)* T/Tc+KOLD$$

where Tc is an image blur prevention sensitivity change time shown in FIG. 11B. Thus, the value of the image blur prevention sensitivity K varies corresponding to a straight line denoted by one-dash lines of FIG. 11B.

The image blur correction microcomputer ICPU calculates the deviation of the image blur correction optical system ILNS at step (320). The image blur correction microcomputer ICPU drives and controls the image blur correction optical system ILNS at step (321). The system returns the flow to the step (311) through step (322). The image blur correction microcomputer ICPU executes operations in the steps (311) to (315). The system returns the flow to the step (316). Since "FLS=1" at the step (318), the system branches the flow from the step (316) to the step (331). The image blur correction microcomputer ICPU compares a timer count time T with a timer upper limit value Tc. When "T≦Tc", the system branches the flow to step (319). The image blur correction microcomputer ICPU continuously changes the value of the image blur prevention sensitivity K. When "T≧Tc", since the value of the image blur prevention sensitivity K has been changed, the system advances the flow from the step (331) to step (332).

The image blur correction microcomputer ICPU resets the timer T to "0" at the step (332). The image blur correction microcomputer ICPU resets the flag FLC to "0" at step (333). "FLC=0" represents that the continuous change of the image blur prevention sensitivity has been completed. The image blur correction microcomputer ICPU updates the value stored in the register KOLD at step (334). The image blur correction microcomputer ICPU substitutes the new value (the value stored in the register KNEW) into the register K at step (335).

In the above-described flow, even if the value of the image blur prevention sensitivity read from the ROM is changed in a step shape while the image blur correction operation is being performed, as shown in FIG. 11B, the value of the image blur prevention sensitivity is continuously changed corresponding to a straight line in the predetermined time period tc, an abrupt image blur correction error does not take place.

Fifth Embodiment

In the fourth embodiment, when the zooming velocity or the focusing velocity is too fast, the changing timing of K (Z, B) may become lower than the predetermined (constant) image blur prevention sensitivity change time period tc. Thus, an abrupt image blur correction error takes place. To solve such a problem, the change time period tc is varied corresponding to the zooming velocity or the focusing velocity. Next, with reference to a flow chart shown in FIG. 13, an operation of a fifth embodiment of the present invention will be described.

Figure 13:
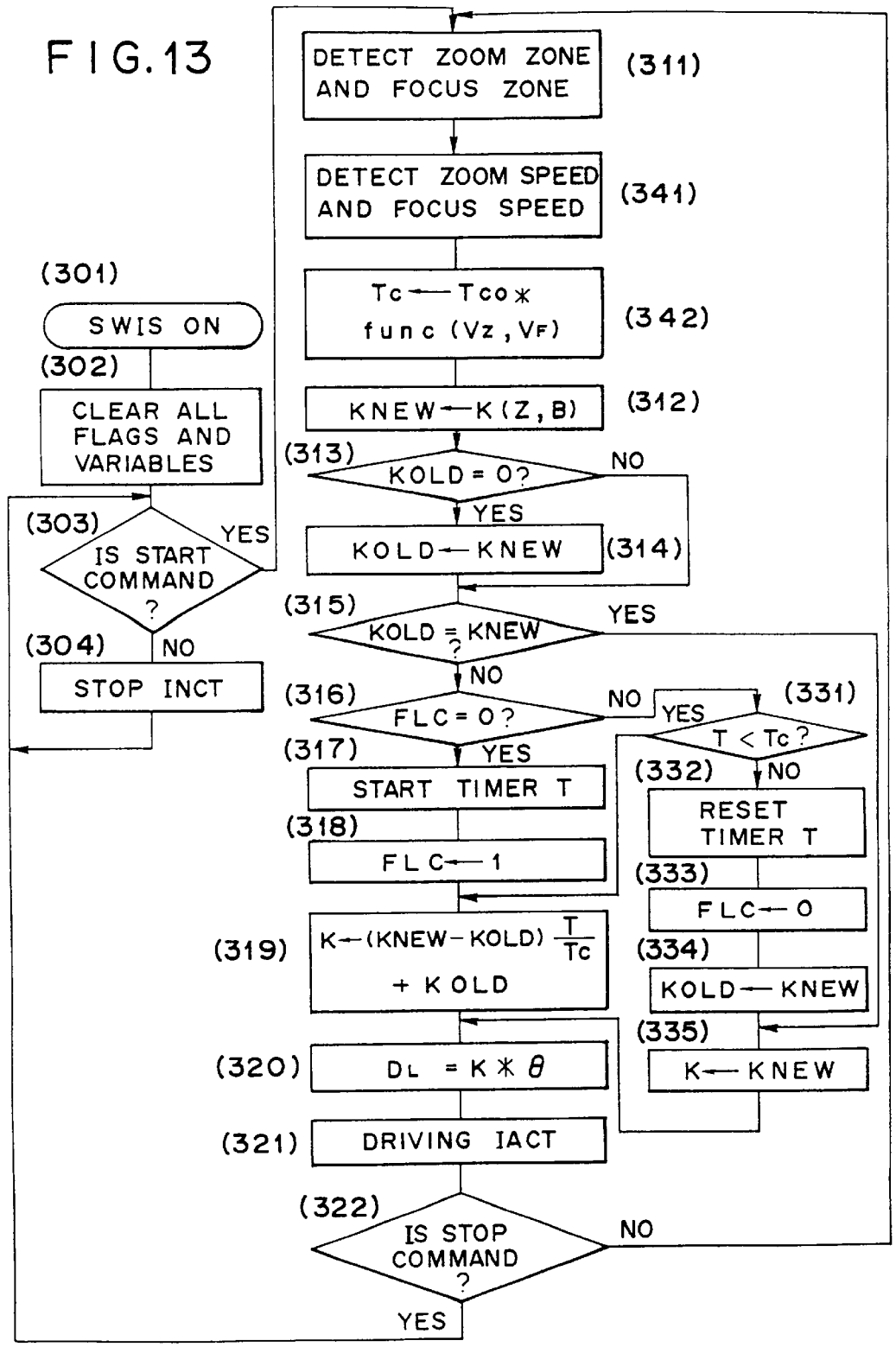
FIG. 13 is a flow chart showing an operation of an image blur correction microcomputer according to a fifth embodiment of the present invention.

In the flow shown in FIG. 13, steps (341) and (342) are added between the flows (311) and (312) of the flow shown in FIG. 12 of the fourth embodiment.

In FIG. 13, an image blur correction microcomputer ICPU executes an operation at step (311). The image blur correction microcomputer ICPU determines a zooming velocity and a focusing velocity at step (341). These velocities can be determined by the following manners.

The zooming velocity and the focusing velocity are determined by detecting real rotation velocities of a zoom drive motor ZMTR or a focus drive motor FMTR or rotation command velocity by the in-lens microcomputer LCPU.

A timing interval of a zoom zone or a focus zone is measured by a timer means other than the timer T at the step (317) in FIG. 13.

The image blur correction microcomputer ICPU calculates a change time period Tc corresponding to a reference time period Tco and a function func (Vz, Vf), where Vz is the zoom velocity and Vf is the focus velocity. When the values of Vz and Vf become small, the value of func (Vz, Vf) becomes large. The function func (Vz, Vf) is stored in a ROM of the image blur correction microcomputer ICPU along with Tco.

In steps (319) and (331), Tc is the value calculated at the step (342). In other words, in the above-described flow, the image blur prevention sensitivity change time period tc varies corresponding to the zooming velocity or the focusing velocity. Thus, the value of the image blur prevention sensitivity can be precisely changed corresponding to these velocities.

Sixth Embodiment

In the fourth and fifth embodiments, the image blur prevention sensitivity is continuously changed in the predetermined time period so as to prevent the image blur correction optical system from abruptly being moved. This construction may be substituted with another method. Next, with reference to a flow chart shown in FIG. 14, this method is described as a sixth embodiment of the present invention.

Figure 14:
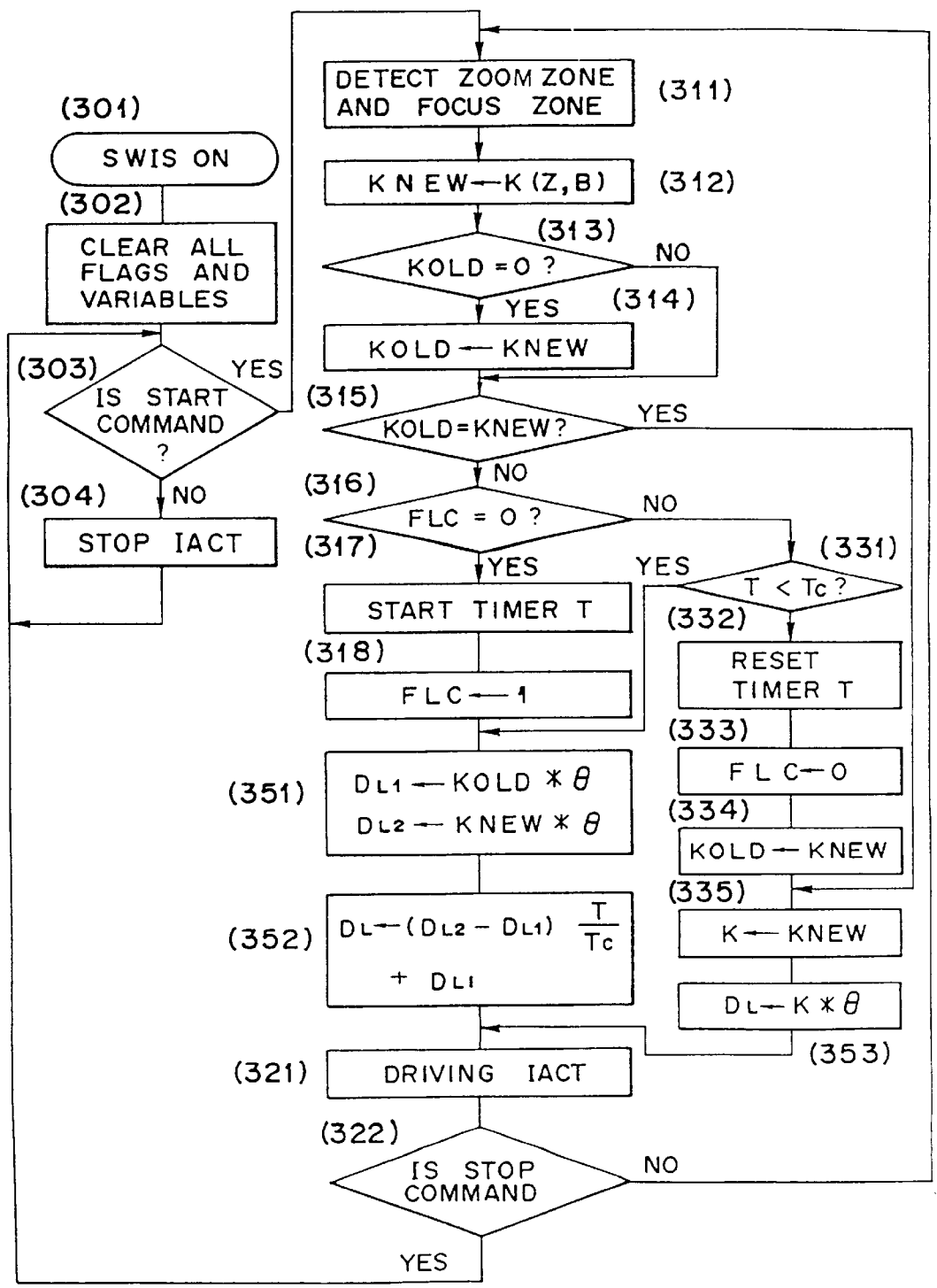
FIG. 14 is a flow chart showing an operation of an image blur correction microcomputer according to a sixth embodiment of the present invention.

FIG. 14 is a flow chart showing an operation of the sixth embodiment. In the sixth embodiment, a control deviation value of an image blur correction optical system ILNS is calculated corresponding to both an old value of the image blur prevention sensitivity and a new value of the new image blur prevention sensitivity. With the calculated results, the present control deviation value is obtained.

In the flow chart shown in FIG. 14, the steps (319) and (320) shown in FIG. 12 of the fourth embodiment are substituted with steps (351) and (352), respectively. In addition, step (353) is added after the step (335). In the sixth embodiment, only different portions not described in the fourth embodiment will be described.

An image blur correction microcomputer ICPU calculates control deviation value $D_{L1}$ and $D_{L2}$ of the image blur correction optical system corresponding to an old value KOLD and a new value KNEW of the image blur prevention sensitivity at step (351). The image blur correction microcomputer ICPU calculates a real control deviation value $D_L$ corresponding to the following equation at step (352).

$$DL=(D_{L2}-D_{L1})*T/Tc+D_{L1}$$

The image blur correction microcomputer ICPU controls the lens at step (321).

When the value of the image blur prevention sensitivity is not changed or when a predetermined time period elapsed after the value was changed, the system advances the flow from the step (335) to step (353) and in the step (335), latest value KNEW is set as value K. The image blur correction microcomputer ICPU calculates KNEW as value K the real control deviation value $D_L$ corresponding to the following equation at step (353).

$$D_L=K* \theta$$

The image blur correction microcomputer ICPU controls the lens at step (321).

In the sixth embodiment, although the value of the image blur prevention sensitivity is not continuously changed, the same effect as the fourth embodiment can be obtained.

Seventh Embodiment

In the fourth to sixth embodiments, the value of the image blur prevention sensitivity is substantially continuously changed so as to prevent an abrupt image blur correction error from taking place. When the change timing of the image blur prevention sensitivity is adjusted, such an error can be prevented from taking place.

As described above, in FIGS. 5A to 5D, if the value of the image blur prevention sensitivity K (Z, B) is changed when an angular deviation θ of hand vibration is "0" at a time t1, an abrupt image blur correction error does not take place. Thus, if the value of the image blur prevention sensitivity is changed when the angular deviation θ of hand vibration becomes "0" rather than at times t2 and t3, an abrupt image blur correction error can be prevented.

FIGS. 15A to 15D are graphs for explaining an operation of the seventh embodiment.

In FIGS. 15A and 15B, when an output of a zoom position detection encoder varies at the time t1, the angular deviation θ of hand vibration is detected. At this time, the angular deviation θ of hand vibration is substantially "0". Thus, when the output of the encoder varies at the times t2 and t3, since the angular deviation θ of hand vibration at the times t2 and t3 is not "0". Consequently, the value of the image blur prevention sensitivity K (Z, B) is prohibited from being changed. When the angular deviation θ of hand vibration substantially becomes "0" at times t2' and t3', the value of the image blur prevention sensitivity K (Z, B) can be changed. A time period denoted by one-dash lines of FIG. 15B represents that the operation of this embodiment does not work, namely the value of the image blur prevention sensitivity K (Z, B) is changed.

Thus, the image blur correction optical system gradually deviates as shown by a solid line of FIG. 15C. Consequently, as shown in FIG. 15D, an abrupt image error correction error can be prevented from taking place.

Figure 16:
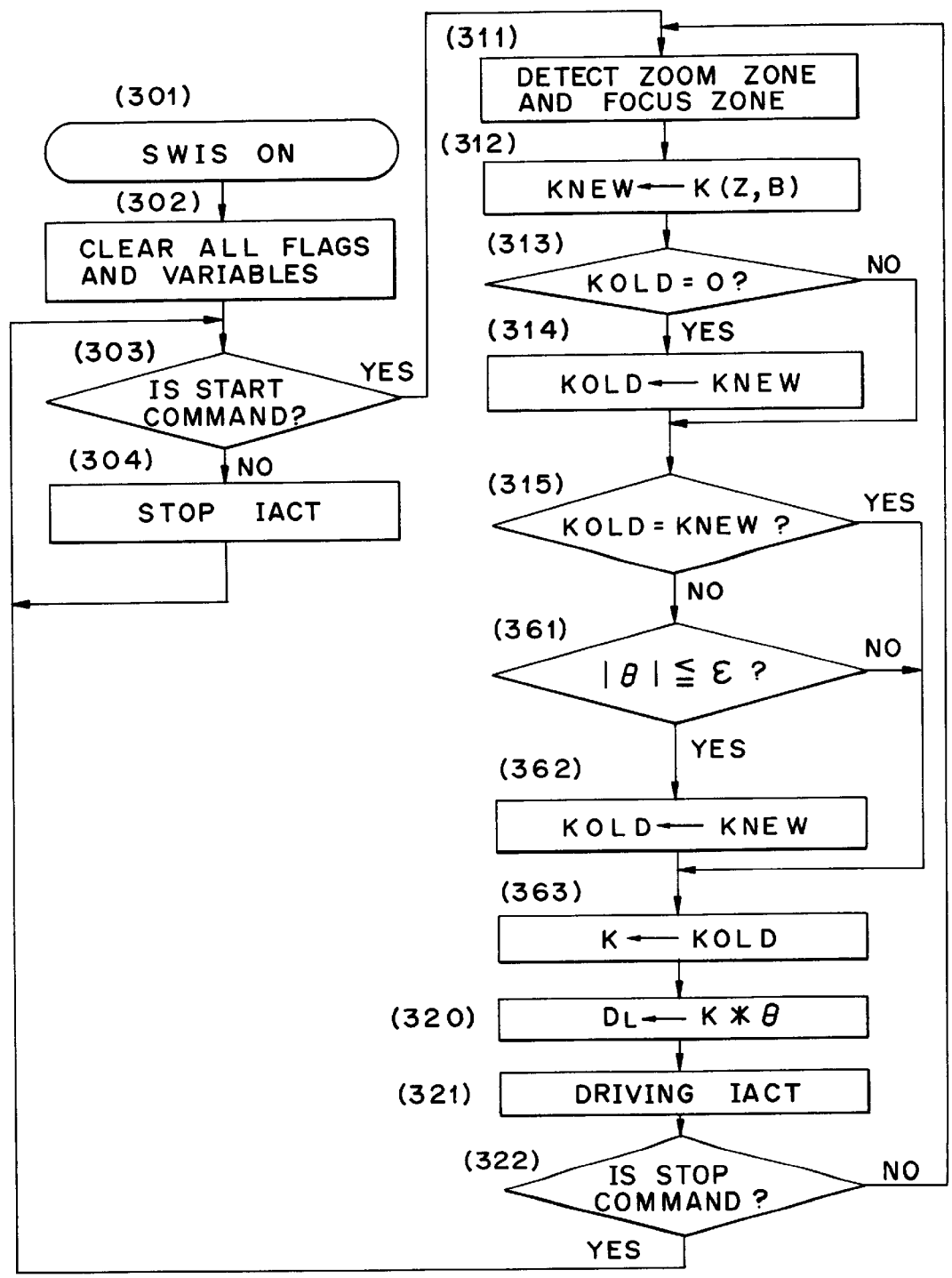
FIG. 16 is a flow chart showing an operation of an image blur correction microcomputer according to the seventh embodiment of the present invention.

FIG. 16 is a flow chart showing an operation of the seventh embodiment. In the flow of the seventh embodiment, the steps (316) to (319) and the steps (331) to (335) are deleted from the flow of the fourth embodiment shown in FIG. 12. In the flow of the seventh embodiment, steps (361) to (363) are added. In the seventh embodiment, only steps different from the fourth embodiment will be described.

An image blur correction microcomputer ICPU compares an old value of image blur prevention sensitivity (a value stored in a register KOLD) with a new value thereof (a value stored in a register KNEW) at step (315). When these values are matched, the system jumps the flow to step (363). The image blur correction microcomputer ICPU substitutes the value stored in the register KOLD (this value is equal to the value stored in the register KNEW) into a register K. The image blur correction microcomputer ICPU calculates a deviation $D_L$ of an image blur correction optical system corresponding to the value stored in the register K and the angular deviation θ of hand vibration.

When "KOLD≠KNEW at step (315), since the value of the image blur prevention sensitivity has been changed, the system advances the flow to step (361). The image blur correction microcomputer ICPU compares an absolute value |θ| of the present angular deviation θ of hand vibration with a predetermined value ε. The value ε is an error allowable limit value at which even if an abrupt image blur correction error takes place, it does not affect the deterioration of the image. When the absolute value |θ| angular deviation is larger than the limit value ε, the system advances the flow to step (363). The image blur correction microcomputer ICPU substitutes the old value of the image blur prevention sensitivity (the value stored in the register KOLD) into the register K. In other words, the image blur correction microcomputer ICPU prohibits the value of the image blur pre-vention sensitivity from being changed to the new value (the value stored in the register KNEW).

The image blur correction microcomputer ICPU executes an image blur correction loop in steps (311) to (312). When |θ|≦ε at the step (361) with a change of the angular deviation θ of hand vibration, the system advances the flow to step (362). The image blur correction microcomputer ICPU substitutes the value stored in the register KNEW into the register KOLD at the step (362). Thus, the image blur correction microcomputer ICPU allows the value of the image blur prevention sensitivity to be changed. The image blur correction microcomputer ICPU substitutes the updated value (the value stored in the register KOLD) into the register K at step (363).

In the above-described flow, only when the angular deviation |θ| of hand vibration is the predetermined value ε or less, the image blur correction microcomputer ICPU allows the value of the image blur prevention sensitivity K (Z, B) to be changed.

Eighth Embodiment

In the first to seventh embodiments, the detected angular deviation of hand vibration is multiplied by the value of image blur prevention sensitivity so as to obtain a deviation control value of the image blur correction optical system. However, in a system that detects an angular velocity of hand vibration and drives such an optical system, the same effects as the above-described embodiments can be obtained with a different method.

Figure 17:
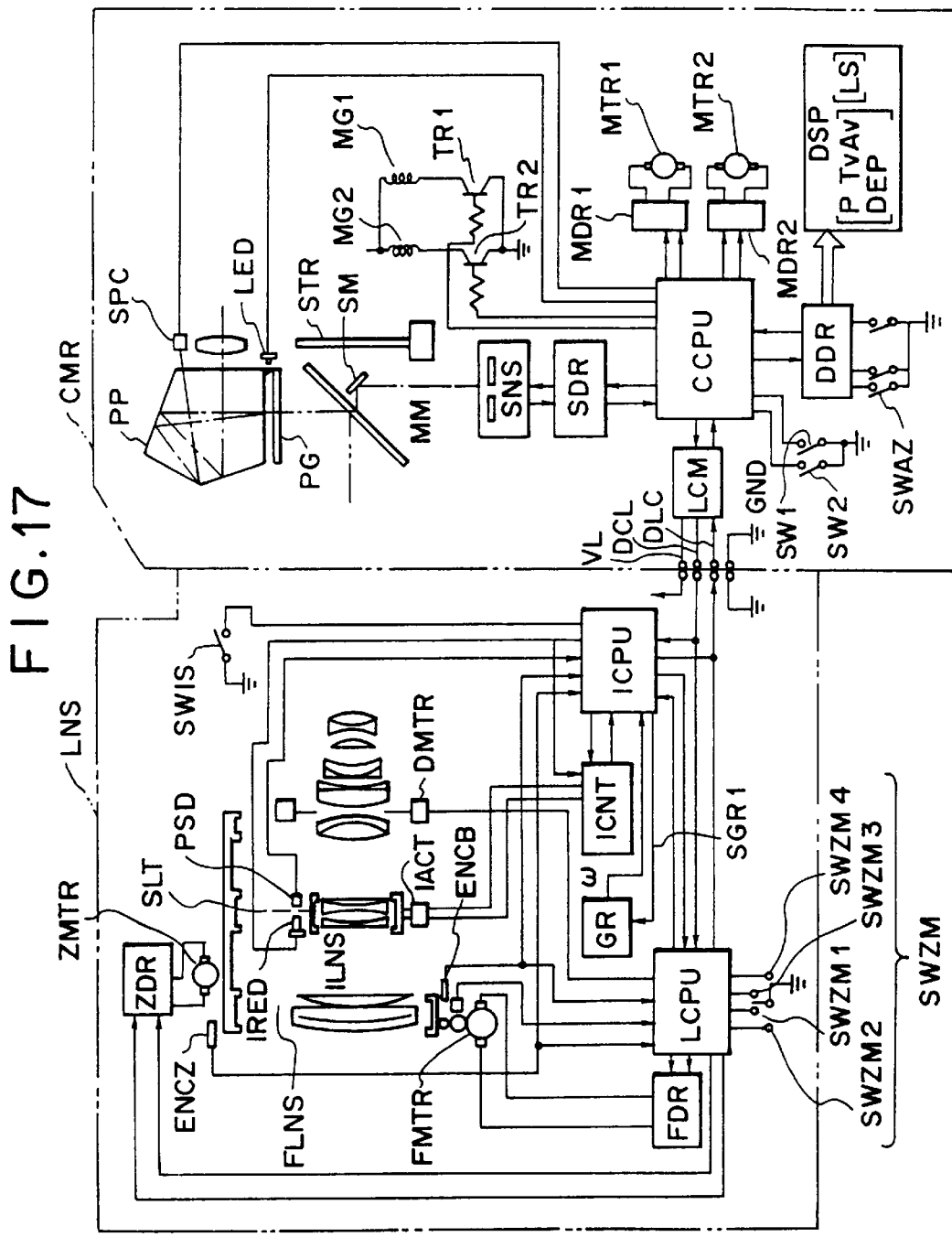
FIG. 17 is a schematic diagram showing an outlined construction of a camera having an image blur correction apparatus according to an eighth embodiment of the present invention.

FIG. 17 is a schematic diagram showing a construction of a camera according to an eighth embodiment of the present invention. The difference between the construction of the eighth embodiment shown in FIG. 17 and the construction of the first embodiment shown in FIG. 1 is in that the hand vibration detection sensor is substituted with an angular velocity meter GR such as a vibration gyro and a hand vibration angular velocity w is output to an image blur correction microcomputer ICPU.

FIG. 18 is a flow chart showing an operation of the image blur correction microcomputer ICPU of an lens LNS according to the eighth embodiment of the present invention. Since steps (401) to (404) in the flow are the same as those of the first to seventh embodiments, their description is omitted.

[Step (403)] The image blur correction microcomputer ICPU receives an image blur correction (IS) start command from a camera main body CMR. The system jumps the flow to step (411).

[Step (411)] The image blur correction microcomputer ICPU detects a present zoom zone and a present focus zone corresponding to outputs of a zoom encoder ENCZ and a focus encoder ENCB, respectively.

[Step (412)] The image blur correction microcomputer ICPU reads the value of an image blur prevention sensitivity K (Z, B) corresponding to the zone detected at the step (411) from a lookup table of a ROM thereof and stores the value in a register K.

[Step (413)] The image blur correction microcomputer ICPU receives a hand vibration angular velocity signal ω from the angular velocity meter GR.

[Step (414)] The image blur correction microcomputer ICPU calculates a drive velocity control value $V_L$ of an image blur correction optical system ILNS corresponding to the value of the image blur prevention sensitivity stored in the register K and the hand vibration angular velocity signal ω.

[Step (415)] The image blur correction microcomputer ICPU integrates the drive velocity control value $V_L$ so as to obtain a drive deviation control value $D_L$ of the image blur correction optical system ILNS.

[Step (416)] The image blur correction microcomputer ICPU drives an image blur correction actuator IACT corresponding to the drive deviation control value $D_L$.

[Step (417)] The image blur correction microcomputer ICPU determines whether or not an image blur correction command has been received from the camera main body CMR. When the image blur correction command has not been received from the camera main body CMR, the system returns the flow to the step (411). The image blur correction microcomputer ICPU repeatedly executes the image blur correction flow.

In this flow, the order of the steps (414) and (415) is important. In other words, the integration operation at the step (415) is an incremental operation. When the incremental operation is performed, even if the drive velocity control value $V_L$, which is an input signal, varies in a step shape corresponding to a change of the value of the image blur prevention sensitivity, the drive deviation control value $D_L$, which is an output of the incremental operation, does not vary in the step shape. Instead, only the slope of the drive deviation control value $D_L$ varies. Thus, even if the value of the image blur prevention sensitivity is changed at any time at the step (412), an abrupt image blur correction error does not take place.

According to the above-described embodiments, even if the zooming operation or the focusing operation is performed, an abrupt image blur correction error does not take place. In addition, while the zooming operation or the focusing operation is being performed, an image storage of an AF sensor or an exposure operation for a film is prohibited from taking place. Thus, the AF control can be precisely performed. In addition, a picture with a small image blur correction error can be taken.

According to another embodiment, since an actuator for preventing the abrupt image blur correction error does not operate while another actuator such as a focus drive motor, a zoom drive motor, an aperture drive motor, or the like is operating. Thus, the drive failure of the actuators and insufficient power supply to the control circuit can be prevented.

As described above, according to the first and second embodiments of the present invention, a prohibition means is provided for prohibiting a changing operation of a changing means and a light amount adjustment operation of a light amount adjustment means from being performed at the same time. Thus, the operation for changing an image blur correction coefficient selected from a storage means corresponding to a zooming optical member or (and) a focusing optical member is prevented from being performed while a light amount adjustment operation for a light converting device or a photosensitive material disposed in the vicinity of a focusing plane of a focusing optical system is being performed.

Consequently, a picture free of an image blur can be taken with a precise focusing adjustment operation.

According to the third embodiment of the present invention, a prohibition means is provided for prohibiting a change operation of a change means and a drive operation of an actuator that is driven corresponding to a picture taking preparation from being performed at the same time. Thus, the operation for changing an image blur correction coefficient selected from a storage means corresponding to a zooming optical member or (and) a focusing optical member is prevented from being performed while an actuator driven corresponding to the picture taking preparation is being driven.

Consequently, since a plurality of actuators do not consume a large amount of electricity at the same time, these actuators do not adversely affect each other.

According to the fourth to eighth embodiment of the present invention, first and second hold means are provided for holding first and second image blur correction coefficients selected from a storage means corresponding to an output of a position detection means. A calculation means is provided for calculating a third image blur correction coefficient corresponding to the first and second image blur correction coefficients. A selection means is provided for selecting one of the fist, second and third image blur correction coefficients. An image blur correction means is provided for driving an image blur correction optical mechanism corresponding to both an output of a vibration detection means that detects a vibration applied to a focusing optical system and the image blur correction coefficient selected by the selection means so as to perform an image blur correction. Thus, the third image blur correction coefficient is calculated corresponding to the first and second image blur correction coefficients. The third image blur correction coefficient is a value that continuously varies between the first and second values so that the third image blur correction coefficient is used when a selected image blur correction coefficient is changed from the first value to the second value.

Consequently, since an abrupt image blur error, which takes place when the zooming optical member and the focusing adjustment optical member are moved, is reduced, the image blur correction can be always accurately performed.

The image blur detection means may be any sensor that can detect an image blur. Examples of the image blur detection means are a deviation sensor, an angular deviation sensor, a velocity sensor, an angular velocity sensor, an acceleration sensor, and an angular acceleration sensor.

The image blur prevention means is not limited to a means that moves an optical member on a substantially vertical plane against an optical axis so as to prevent an image blur. Instead, another image blur prevention means such as a variable angle prism may be used.

The present invention may be applied to image taking apparatuses (such as silver-halide still cameras, still video cameras and movie video cameras) and other optical apparatuses.

The image blur detection means and the image blur prevention means are not always disposed in a single apparatus. Instead, these means may be disposed in respective incorporable apparatuses (such as a camera and an interchangeable lens incorporated with the camera). By attaching the lens to the camera, the image blur prevention system may be formed.

What is claimed is:

1. An apparatus for use with an image blur prevention device and an optical device, the image blur prevention device including an image blur prevention portion operable to perform image blur prevention and a driving portion which drives the image blur prevention portion in accordance with a fluctuation signal corresponding a fluctuation that causes image blur, the optical device including an optical system which is continuously displaced and a movement detection portion which generates an output per every predetermined amount of displacement of the optical system, said apparatus comprising:

a signal formation portion which forms a driving signal for operating said driving portion, to drive said image blur prevention portion, said signal formation portion performing a calculation using a predetermined parameter to form said driving signal;

a varying portion which varies the predetermined parameter in accordance with the output of said movement detection portion; and an operation portion which prevents an abrupt displacement of said image blur prevention portion caused by variation of said predetermined parameter by said varying portion.

2. An apparatus according to claim 1, wherein said varying device includes means for varying a coefficient that determines the relation between the input signal and a driving signal of the image blur prevention device.

3. An apparatus according to claim 2, wherein the input signal corresponds to an amount of image blur in the imaging apparatus, said varying device including means for varying the coefficient between the input signal and the driving signal of the image blur prevention device.

4. An apparatus according to claim 3, wherein the input signal is an output of a blur detection unit that detects the blur.

5. An apparatus according to claim 2, wherein said varying device includes means for varying the coefficient to at least a first coefficient and a second coefficient being different from the first coefficient.

6. An apparatus according to claim 1, wherein said prevention device includes interlocking means for interlocking between an operation state of an image operation device that performs device that a predetermined operation to the image to which the image blur prevention device is operated and an operation of said varying device.

7. An apparatus according to claim 6, wherein said interlocking means includes regulation means for regulating the operation of said varying device in response to the operation state of said operation device.

8. An apparatus according to claim 7, wherein said regulation means includes means for prohibiting the operation of said varying device in accordance with the operation device being operated.

9. An apparatus according to claim 6, wherein the operation device is a device for performing an exposure operation.

10. An apparatus according to claim 6, wherein the operation device is a device for performing one of an image signal accumulation and image signal reading.

11. An apparatus according to claim 6, wherein said interlocking means includes regulation means for regulating the operation of the operation device in response to the operation state of said varying device.

12. An apparatus according to claim 11, wherein said regulation means includes means for prohibiting the operation of the operation device in accordance with an operation of said varying device.

13. An apparatus according to claim 6, wherein the image operation device includes means for adjusting an amount of light incident to an imaging portion.

14. An apparatus according to claim 13, wherein a degree of image blur prevention which is achieved by the predetermined operation of the image blur prevention device is changed in accordance with a state change of the optical system, said varying device includes means for varying the operation of the image blur prevention device so that the degree of image blur prevention is substantially kept constant in accordance with the determination result of said determination device.

15. An apparatus according to claim 14, wherein the image blur prevention device includes an image blur correction device for correcting image blur.

16. An apparatus according to claim 1, wherein said prevention device includes regulation means for regulating the operation of said varying device in response to a state of an image blur prevention operation.

17. An apparatus according to claim 16, wherein said regulation means includes means for regulating said varying device in response to a state of the input signal.

18. An apparatus according to claim 17, wherein the input signal is a signal corresponding to an amount of image blur in the imaging apparatus, said varying device including means for varying a coefficient that determines the relation between the input signal and a driving signal, and said regulation means including means for causing said varying device to change the coefficient only when the driving signal corresponds to a blur which is a predetermined amount or less.

19. An apparatus according to claim 18, wherein said regulation means includes means for causing said varying device to change the coefficient only when the input signal is a signal corresponding to a state in which the blur is below a predetermined amount.

20. An apparatus according to claim 1, wherein said prevention device includes means for causing the change of relation by said varying device to continuously perform.

21. An apparatus according to claim 20, wherein said varying device includes means for varying the coefficient to at least a first coefficient and a second coefficient being different from the first coefficient and said prevention device includes means for causing the coefficient to continuously varying when a varying between the first and second coefficients is performed.

22. An apparatus according to claim 21, wherein said prevention means includes means for converting the coefficient into a function of an elapsed time when the change is performed.

23. An apparatus according to claim 21, wherein the image blur prevention device is disposed downstream of at least part of an optical means which varies a focal length on an optical axis, said prevention device including means for changing the predetermined time period in response to an operation velocity of the optical means.

24. An apparatus according to claim 20, wherein said prevention means includes means for performing the change within a predetermined time period.

25. An apparatus according to claim 20, wherein said prevention means includes control means for performing an incremental operation in response to the signal and for controlling the operation of the image blur prevention unit based on a calculation result.

26. An apparatus according to claim 25, wherein said control means includes means for integrating a signal which is obtained by processing the signal based on the coefficient.

27. An apparatus according to claim 1, wherein the image blur prevention unit includes light beam deflection means for deflecting the light beam by moving in an optical path.

28. An apparatus according to claim 1, wherein the apparatus comprises means for determining a focal length of the optical system.

29. An apparatus according to claim 1, wherein the image blur prevention device includes an image blur correction device for correcting image blur.

30. An apparatus according to claim 1, wherein the optical system is located at a position which is nearer on an optical axis than at least a portion of the image blur prevention device.

31. An apparatus according to claim 1, wherein the image blur prevention device includes means for optically preventing image blur.

32. An apparatus adapted to an optical device which includes an optical system which is continuously displaced and a movement detection portion which generates an output per every predetermined amount of displacement of the optical system, said apparatus comprising:

an image blur prevention portion operable to perform image blur prevention;

a driving device which drives said image blur prevention portion in accordance with a fluctuation signal corresponding to a fluctuation that causes image blur;

a signal formation portion which forms a driving signal for operating said driving portion, to drive said image blur prevention portion, said signal formation portion performing a calculation using a predetermined parameter to form said driving signal;

a varying portion which varies the predetermined parameter in accordance with the output of said movement detection portion; and an operation portion which prevents an abrupt displacement of said image blur prevention portion caused by variation of the predetermined parameter by said varying portion.

33. An optical apparatus to which an image blur prevention device is applied, the image blur prevention device including an image blur prevention portion operable to perform image blur prevention and a driving portion which drives the image blur prevention portion in accordance with a fluctuation signal corresponding to a fluctuation that causes image blur, said apparatus comprising:

an optical system that is continuously displaced;

a movement detection portion which generates an output per every predetermined amount of displacement of the optical system;

a signal formation portion which forms a driving signal for operating said driving portion, to drive said image blur prevention portion, said signal formation portion performing a calculation using a predetermined parameter to form the driving signal;

a varying portion which varies the predetermined parameter in accordance with the output of said movement detection portion; and an operation portion which prevents an abrupt displacement of said image blur prevention portion caused by variation of the predetermined parameter by said varying portion.

34. An equipment according to claim 33, wherein said operation means includes light beam deflection means for deflecting the light beam by moving in an optical path.

35. An apparatus for use with an image blur prevention device and an optical device, the image blur prevention device including an image blur prevention portion operable to perform image blur prevention and a driving portion which drives the image blur prevention portion in accordance with a fluctuation signal corresponding to a fluctuation that causes image blur, the optical device including an optical system which is displaced for focus adjustment or zoom adjustment and a movement detection portion which generates an output in accordance with displacement of the optical system, said apparatus comprising:

a signal formation portion which forms a driving signal for operating said driving portion, to drive said image blur prevention portion, said signal formation portion performing a calculation using a predetermined parameter to form said driving signal;

a varying portion which varies the predetermined parameter in accordance with the output of said movement detection portion, said varying portion including (1) memory means for storing a plurality of said predetermined parameters, the values of which are discrete relative to each other, and (2) parameter setting means for selecting a parameter from among said plurality of parameters stored in said memory means in accordance with the output of said movement detection portion so as to set a parameter value used for said calculation, wherein during a time in which said parameter setting means varies the parameter value used for said calculation from a first parameter value stored in said memory means to a discrete second parameter value which is adjacent to said first parameter value and is stored in said memory means, said parameter setting means sets a parameter value to at least a third parameter value between the first parameter value and the second parameter value.

36. An apparatus according to claim 35, wherein said parameter setting means includes means for obtaining said third parameter value by a calculation using a parameter value stored in said memory means.

37. An apparatus according to claim 36, wherein said parameter setting means includes means for obtaining said third parameter value by a calculation using said first and second parameter values stored in said memory means.

38. An apparatus according to claim 35, wherein said parameter setting means includes a timer and means for obtaining said third parameter value in accordance with a measurement result of said timer.

39. An apparatus according to claim 38, wherein said parameter setting means includes means for sequentially varying said third parameter value a plurality of times during a time in which the parameter value is changed between said first and second parameter values.

40. An apparatus according to claim 38, wherein said memory means includes a ROM and said parameter setting means includes means for reading out data in said ROM.

41. An apparatus according to claim 39, wherein said image blur prevention portion includes means for preventing image blur by activating a light beam passing through said optical system.

42. An apparatus according to claim 41, wherein said image blur prevention portion includes means for activating said light beam passing through said optical system at a position behind said optical system in a travelling direction of the light beam.

43. An apparatus according to claim 41, wherein said image blur prevention portion includes means for preventing image blur by optical activation.

44. An apparatus according to claim 35, wherein said image blur prevention portion includes image blur correction means for correcting the image blur.

45. An apparatus according to claim 35, wherein said image blur prevention portion includes movable means for preventing image blur by a displacement.

46. An image blur prevention apparatus for use with an image blur prevention device and an optical device, the image blur prevention device including an image blur prevention portion operable to perform image blur prevention and a driving portion which drives the image blur prevention portion in accordance with a fluctuation signal corresponding to a fluctuation that causes image blur, the optical device including an optical system which is displaced for focus adjustment or zoom adjustment and a movement detection portion which generates an output in accordance with displacement of the optical system, said apparatus comprising:

a signal formation portion which forms a driving signal for operating said driving portion, to drive said image blur prevention portion, said signal formation portion performing a calculation using a predetermined parameter to form said driving signal;

a varying portion which varies the predetermined parameter in accordance with the output of said movement detection portion, said varying portion including (1) memory means for storing a plurality of said predetermined parameters, the values of which are discrete relative to each other, and (2) parameter setting means for selecting a parameter from among said plurality of parameters stored in said memory means in accordance with the output of said movement detection portion so as to set a parameter value used for said calculation, wherein during a time in which said parameter setting means varies the parameter value used for said calculation from a first parameter value stored in said memory means to a discrete second parameter value which is adjacent to said first parameter value and is stored in said memory means, said parameter setting means sets a parameter value to at least a third parameter value between the first parameter value and the second parameter value.

47. An optical apparatus for use with an image blur prevention device and an optical device, the image blur prevention device including an image blur prevention portion operable to perform image blur prevention and a driving portion which drives the image blur prevention portion in accordance with a fluctuation signal corresponding to a fluctuation that causes image blur, the optical device including an optical system which is displaced for focus adjustment or zoom adjustment and a movement detection portion which generates an output in accordance with displacement of the optical system, said apparatus comprising:

a signal formation portion which forms a driving signal for operating said driving portion, to drive said image blur prevention portion, said signal formation portion performing a calculation using a predetermined parameter to form said driving signal;

a varying portion which varies the predetermined parameter in accordance with the output of said movement detection portion, said varying portion including (1) memory means for storing a plurality of said predetermined parameters, the values of which are discrete relative to each other, and (2) parameter setting means for selecting a parameter from among said plurality of parameters stored in said memory means in accordance with the output of said movement detection portion so as to set a parameter value used for said calculation, wherein during a time in which said parameter setting means varies the parameter value used for said calculation from a first parameter value stored in said memory means to a discrete second parameter value which is adjacent to said first parameter value and is stored in said memory means, said parameter setting means sets a parameter value to at least a third parameter value between the first parameter value and the second parameter value.

* * * * *

UNITED STATES PATENT AND TRADEMARK OFFICE
CERTIFICATE OF CORRECTION

PATENT NO. : 6,064,825
DATED : May 16, 2000
INVENTOR(S) : Ichiro Onuki

It is certified that error appears in the above-identified patent and that said Letters Patent is hereby corrected as shown below:

Column 2,
Line 51, "a" should read -- an --.

Column 4,
Line 10, "[Rad]" should read -- [rad] --.

Column 10,
Line 17, "is" should read -- is in --.
Line 61, "sends" should read -- send -- .

Column 12,
Line 26, "original," should read -- original --.

Column 14,
Line 35, "generate" should read -- generates --.

Column 15,
Line 28, "8 an" should read -- 8 and --.

Column 16,
Line 2, "inlens" should read -- in-lens --.

Column 17,
Line 61, "do" should be deleted.
Line 62, "properly work" should read -- work properly --.

Column 18,
Line 47, "bur" should read -- blur --.

Column 21,
Line 11, " "$T \leq Tc$"," should read -- "$T < Tc$", --.

Column 23,
Line 53, " "KOLD$\neq$KNEW" should read -- "KOLD$\neq$KNEW"--.
Line 55, "(361). The" should read -- (361). ¶ The --.

UNITED STATES PATENT AND TRADEMARK OFFICE
CERTIFICATE OF CORRECTION

PATENT NO.    : 6,064,825
DATED         : May 16, 2000
INVENTOR(S)   : Ichiro Onuki Page 2 of 2

It is certified that error appears in the above-identified patent and that said Letters Patent is hereby corrected as shown below:

Column 26,
Line 16, "fist," should read -- first, --.
Line 64, "corresponding" should read -- corresponding to --.

Column 27,
Line 35, "device that" should be deleted.

Column 28,
Line 36, "varying" (first occurrence) should read -- vary --.

Column 29,
Line 58, "equipment" should read -- apparatus --.

Column 30,
Line 45, "claim 38," should read -- claim 35, --.
Line 48, "claim 39," should read -- claim 35, --.

Signed and Sealed this

Eleventh Day of September, 2001

Attest:

NICHOLAS P. GODICI
*Attesting Officer*  *Acting Director of the United States Patent and Trademark Office*